United States Patent
Nishimura et al.

(10) Patent No.: US 10,026,512 B2
(45) Date of Patent: Jul. 17, 2018

(54) NUCLEAR REACTOR NOZZLE REPAIR METHOD

(71) Applicant: MITSUBISHI HEAVY INDUSTRIES, LTD., Tokyo (JP)

(72) Inventors: Tsuyoshi Nishimura, Tokyo (JP); Takeshi Yamamoto, Tokyo (JP); Hideshi Sakashita, Tokyo (JP); Tomonobu Sato, Tokyo (JP); Akio Yamamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 386 days.

(21) Appl. No.: 14/655,111

(22) PCT Filed: Dec. 24, 2013

(86) PCT No.: PCT/JP2013/084522
§ 371 (c)(1),
(2) Date: Jun. 24, 2015

(87) PCT Pub. No.: WO2014/104031
PCT Pub. Date: Jul. 3, 2014

(65) Prior Publication Data
US 2015/0348658 A1    Dec. 3, 2015

(30) Foreign Application Priority Data
Dec. 28, 2012  (JP) ................. 2012-289031

(51) Int. Cl.
*G21C 13/036*    (2006.01)
*G21C 13/067*    (2006.01)
(Continued)

(52) U.S. Cl.
CPC ......... *G21C 13/036* (2013.01); *G21C 13/067* (2013.01); *G21C 13/0675* (2013.01);
(Continued)

(58) Field of Classification Search
CPC .. G21C 13/032; G21C 13/036; G21C 13/067; G21C 13/0675
See application file for complete search history.

(56) References Cited

U.S. PATENT DOCUMENTS

| | | | | |
|---|---|---|---|---|
| 5,605,361 | A | * | 2/1997 | Sims ................. F16L 41/08 285/15 |
| 2011/0194663 | A1 | * | 8/2011 | Hori .................. F16L 5/022 376/204 |
| 2012/0175352 | A1 | | 7/2012 | Kamo et al. | |

FOREIGN PATENT DOCUMENTS

| | | |
|---|---|---|
| JP | 2-102493 A | 4/1990 |
| JP | 2-118500 A | 5/1990 |
| JP | 6-35996 U | 5/1994 |
| JP | 2007-232457 A | 9/2007 |
| JP | 2011-75453 A | 4/2011 |

OTHER PUBLICATIONS

International Search Report dated Apr. 8, 2014 issued in corresponding application No. PCT/JP2013/084522 (2 pages).
(Continued)

*Primary Examiner* — Sharon M Davis
(74) *Attorney, Agent, or Firm* — Westerman, Hattori, Daniels & Adrian, LLP

(57) ABSTRACT

A nozzle repair method and a nuclear reactor vessel include: removing a trepanning portion (208) as a connection portion with respect to an in-core instrumentation cylinder (204) in a groove-welding portion (206); removing the in-core instrumentation cylinder (204) from a lower end plate (66); forming a plug attachment opening (211) by removing the groove-welding portion (206); applying a pressing load to the lower end plate (66) by attaching a plug (212) to the plug attachment opening (211); and welding and fixing the plug (212) attached to the plug attachment opening (211). Accordingly, since a repair is easily performed, it is possible to improve the workability and to decrease a repair cost.

3 Claims, 22 Drawing Sheets

(51) Int. Cl.
*G21C 17/017* (2006.01)
*G21C 19/20* (2006.01)
*G21C 19/02* (2006.01)
G21C 13/06 (2006.01)
G21C 1/08 (2006.01)
G21C 17/003 (2006.01)

(52) U.S. Cl.
CPC ........... *G21C 17/017* (2013.01); *G21C 19/02* (2013.01); *G21C 19/207* (2013.01); G21C 1/086 (2013.01); G21C 13/06 (2013.01); G21C 17/003 (2013.01); Y02E 30/40 (2013.01)

(56) References Cited

OTHER PUBLICATIONS

Written Opinion of the International Searching Authority dated Apr. 8, 2014 issued in corresponding application No. PCT/JP2013/084522 (3 pages).
Extended (supplementary) European Search Report dated Jul. 8, 2016, issued in counterpart Application No. 13866595.5. (8 pages).
Decision of a Patent Grant dated Sep. 20, 2016, issued in counterpart Japanese Patent Application No. 2012-289031, with English translation. (4 pages).
English translation of Written Opinion dated Apr. 8, 2014, issued in counterpart application No. PCT/JP2013/084522. (4 pages).

\* cited by examiner

NUCLEAR REACTOR NOZZLE REPAIR METHOD

FIELD

The present invention relates to a nozzle repair method for repairing a nozzle provided in a nuclear reactor vessel and a nuclear reactor vessel provided with a nozzle.

BACKGROUND

For example, a nuclear power plant that includes a pressurized water reactor (PWR) uses light water as a nuclear reactor coolant and a neutron moderator while keeping the light water as high-temperature and high-pressure water which is not boiled throughout a reactor core, sends the high-temperature and high-pressure water to a vapor generator so as to generate a vapor by a heat exchange operation, and sends the vapor to a turbine generator so as to generate electric power.

In such a nuclear power plant, there is a need to periodically inspect various structures of the pressurized water reactor in order to ensure sufficient safety or reliability. Then, when a problem is found after various inspections, a necessary portion involved with the problem is repaired. For example, in the pressurized water reactor, a nuclear reactor vessel body is provided with a plurality of instrumentation nozzles penetrating a lower end plate. Further, each of the instrumentation nozzles is formed so that an in-core instrumentation guide pipe is fixed to the upper end thereof inside the reactor and a conduit tube is connected to the lower end thereof outside the reactor. Then, a neutron flux detector capable of measuring a neutron flux is insertable from the instrumentation nozzle to a reactor core (a fuel assembly) through the in-core instrumentation guide pipe by using the conduit tube.

The instrumentation nozzle is formed in a manner such that an in-core instrumentation cylinder formed of a nickel base alloy is fitted into an attachment hole of a nuclear reactor vessel body formed of low-alloy steel and is welded by a nickel base alloy. For that reason, there is a possibility that a stress corrosion crack may occur in the in-core instrumentation cylinder due to the long-term use. Thus, when the stress corrosion crack occurs, there is a need to repair the instrumentation nozzle. A nozzle repair method of the related art is disclosed in, for example, Patent Literature 1 below. The nozzle repair method disclosed in Patent Literature 1 includes forming a buttered-grooving portion by excavating an inner surface of a vessel in a substantially cylindrical shape in an area including a J-beveling portion, inserting a plug including a plug body portion with an inner end surface forming an extension portion of an outer surface of the buttered-grooving portion and a protrusion protruding from the inner end surface and having the same axis as the buttered-grooving portion into a nozzle hole so that the inner end surface substantially matches the outer surface of the buttered-grooving portion, forming a buttered-welding portion by buttered welding the buttered-grooving portion, forming a J-beveling portion in the buttered-welding portion, and inserting and welding the nozzle.

CITATION LIST

Patent Literature

Patent Literature 1: Japanese Patent Application Laid-open No. 2011-075453

SUMMARY

Technical Problem

In the above-described nozzle repair method of the related art, the buttered-grooving portion is formed on the inner surface of the vessel, the plug is inserted into the nozzle hole, and the plug is buttered welded. Then, the J-beveling portion is formed, and the nozzle is inserted and welded. For that reason, a new nozzle may be attached with high precision, but the repair becomes complex. As a result, a repair cost increases.

The invention is made to solve the above-described problems, and an object of the invention is to provide a nozzle repair method and a nuclear reactor vessel capable of improving workability and decreasing a repair cost by easily performing a repair operation.

Solution to Problem

According to an aspect of the present invention, a nozzle repair method for an instrumentation nozzle in which an in-core instrumentation cylinder is inserted into an attachment hole formed in a semi-spherical portion of a nuclear reactor vessel and the inner surface side of the semi-spherical portion is groove-welded so as to fix the in-core instrumentation cylinder, comprises: removing a connection portion with respect to the in-core instrumentation cylinder in a groove-welding portion; removing the in-core instrumentation cylinder from the semi-spherical portion; forming a plug attachment portion by removing the groove-welding portion; applying a pressing load to the semi-spherical portion by attaching a plug to the plug attachment portion; and welding and fixing the plug attached to the plug attachment portion.

Accordingly, the connection portion with respect to the in-core instrumentation cylinder in the groove-welding portion is removed, the in-core instrumentation cylinder is removed from the semi-spherical portion, the plug attachment portion is formed by removing the groove-welding portion, and the plug is welded and fixed while the plug is attached to the plug attachment portion and a pressing load is applied to the semi-spherical portion. That is, when the in-core instrumentation cylinder is removed from the instrumentation nozzle, the entire groove-welding portion is removed, and the plug is fixed, the instrumentation nozzle is set to an unavailable state. Since the nuclear reactor vessel is provided with the plurality of instrumentation nozzles, even when a small number of instrumentation nozzles may not be used, the other instrumentation nozzles may be used. Accordingly, since the repair operation may be easily performed when the instrumentation nozzle is repaired, the workability may be improved and the repair cost may be decreased. Further, since the plug is attached to the plug attachment portion and is welded thereto while the pressing load is applied to the semi-spherical portion, it is possible to prevent a problem in which a gap is formed between the plug and the plug attachment portion even when the plug heated by welding is cooled. Thus, it is possible to highly precisely fix the plug to the plug attachment portion in a close contact state.

Advantageously, in the nozzle repair method, the semi-spherical portion is formed so that an inner surface is provided with a buttered-welding layer having stress corrosion cracking resistance, and the plug is fixed in a manner such that an outer peripheral portion is welded to the buttered-welding layer while the plug is fitted into the plug attachment portion.

Accordingly, since the outer peripheral portion of the plug is welded to the buttered-welding layer while the plug is fitted into the plug attachment portion, the welding operation for fixing the plug substantially does not give an influence of heat to the nuclear reactor vessel, and the heat treatment is not needed. Thus, the repair operation may be easily performed and the workability may be improved.

Advantageously, in the nozzle repair method, the plug is provided with an upward protrusion portion, and an outer surface of the protrusion portion is welded and fixed to the semi-spherical portion while the plug is fitted into the plug attachment portion.

Accordingly, since the outer surface of the protrusion portion is fixed to the semi-spherical portion by welding while the plug is fitted into the plug attachment portion, the amount of the welding material decreases. Thus, the welding cost may be decreased and the welding operation may be easily performed.

Advantageously, in the nozzle repair method, the protrusion portion includes a vertical wall portion which is formed along an upper outer peripheral portion of the plug, and a concave portion is provided inside the vertical wall portion.

Accordingly, since the upper outer peripheral portion of the plug is provided with the vertical wall portion and the concave portion is provided at the inside thereof, the weight of the plug may be decreased, and hence the cost thereof may be decreased. Also, since the welding heat is radiated through the concave portion, the welding quality may be improved.

Advantageously, in the nozzle repair method, the plug attachment portion is an opening larger than the attachment hole, and includes a support surface supporting the plug, and the plug receives a pressing load while a lower surface is pressed by the support surface.

Accordingly, when the plug is attached to the plug attachment portion and is fixed to the semi-spherical portion, the weight of the plug is supported by the support surface of the plug attachment portion, and hence the welding portion for fixing the plug to the semi-spherical portion may be simplified. Further, since the plug is attached to the plug attachment portion and is welded while the pressing load is applied thereto, it is possible to suppress a problem in which a gap is formed between the lower surface of the plug and the support surface even when the plug heated by welding is cooled, and hence it is possible to fix the plug to the plug attachment portion in a close contact state.

Advantageously, in the nozzle repair method, the plug receives a pressing load while a pulling load is applied from the outside of the semi-spherical portion thereto through the attachment hole.

Accordingly, since a pulling load is applied to the plug from the outside of the semi-spherical portion, an operator does not need to enter the semi-spherical portion, and hence a pressing load may be easily applied to the plug. Thus, the workability may be improved.

According to another aspect of the present invention, a nuclear reactor vessel comprises: a nuclear reactor vessel body of which a lower portion is formed in a semi-spherical shape; a nuclear reactor vessel head which is formed in a semi-spherical shape and is attached to an upper portion of the nuclear reactor vessel body; an inlet nozzle and an outlet nozzle which are provided at the side portion of the nuclear reactor vessel body; a reactor core which is disposed inside the nuclear reactor vessel body and is formed by a plurality of fuel assemblies; a plurality of control rods which is insertable into the fuel assemblies; a control rod driving mechanism which moves the control rods in the vertical direction; a plurality of instrumentation nozzles which is provided at the lower portion of the nuclear reactor vessel body and into which a neutron flux detector is insertable; a plug which plugs any nozzle attachment hole of the plurality of instrumentation nozzles; and a pressing load generating jig which is provided in the plug.

Accordingly, since the lower portion of the nuclear reactor vessel body is provided with the plurality of instrumentation nozzles and the unnecessary instrumentation nozzles are plugged by the plug, the repaired nuclear reactor vessel may ensure high stress corrosion cracking resistance. In this way, the repair cost may be decreased and the stress corrosion cracking resistance may be improved. Further, since the plug is provided with the pressing load generating jig, a pressing load may be easily applied to the plug, and hence the workability may be improved.

Advantageously, in the nuclear reactor vessel, the pressing load generating jig includes a screw shaft which is connected to a lower surface of the plug.

Accordingly, since the screw shaft is connected to the lower surface of the plug in advance, it is possible to apply a pressing load of pressing the plug against the plug attachment portion.

Advantageously, in the nuclear reactor vessel, a deformation member is provided between the lower surface of the plug and a support surface formed in the nozzle attachment hole.

Accordingly, since the deformation member is provided between the lower surface of the plug and the support surface of the nozzle attachment hole, the deformation member is deformed when a pressing load of pressing the plug against the plug attachment portion is applied thereto, and hence the lower surface of the plug and the support surface of the nozzle attachment hole may easily contact each other.

Advantageous Effects of Invention

According to the nozzle repair method of the invention, the connection portion with respect to the in-core instrumentation cylinder in the groove-welding portion is removed, the in-core instrumentation cylinder is removed from the semi-spherical portion, the plug attachment portion is formed by removing the groove-welding portion, and the plug is welded and fixed while the plug is attached to the plug attachment portion and a pressing load is applied to the semi-spherical portion. Since the repair operation is easily performed compared to the case when the instrumentation nozzle is repaired, the workability may be improved and the repair cost may be decreased. At this time, it is possible to suppress a problem in which a gap is formed between the plug and the plug attachment portion, and hence to highly precisely fix the plug to the plug attachment portion in a close contact state. Further, according to the nuclear reactor vessel, since the lower portion of the nuclear reactor vessel body is provided with the plurality of instrumentation nozzles and the unnecessary instrumentation nozzles are plugged by the plug, the repaired nuclear reactor vessel may ensure high stress corrosion cracking resistance. In this way, the repair cost may be decreased and the stress corrosion cracking resistance may be improved. Further, since the plug is provided with the pressing load generating jig, a pressing load may be easily applied to the plug, and hence the workability may be improved.

BRIEF DESCRIPTION OF DRAWINGS

FIG. 11-1 is a schematic diagram illustrating a trepanning operation for the in-core instrumentation cylinder.

FIG. 11-2 is a cross-sectional view illustrating the trepanned in-core instrumentation cylinder.

FIG. 18-1 is a schematic diagram illustrating the instrumentation nozzle in which a pressing force is applied to the plug.

FIG. 18-2 is a diagram illustrating a pressing force for the plug.

DESCRIPTION OF EMBODIMENTS

Hereinafter, preferred embodiments of a nozzle repair method and a nuclear reactor vessel according to the invention will be described in detail with reference to the accompanying drawings. Furthermore, the invention is not limited to the embodiment. Further, when a plurality of embodiments is provided, the embodiments may be combined with one another.

First Embodiment

Figure 2:
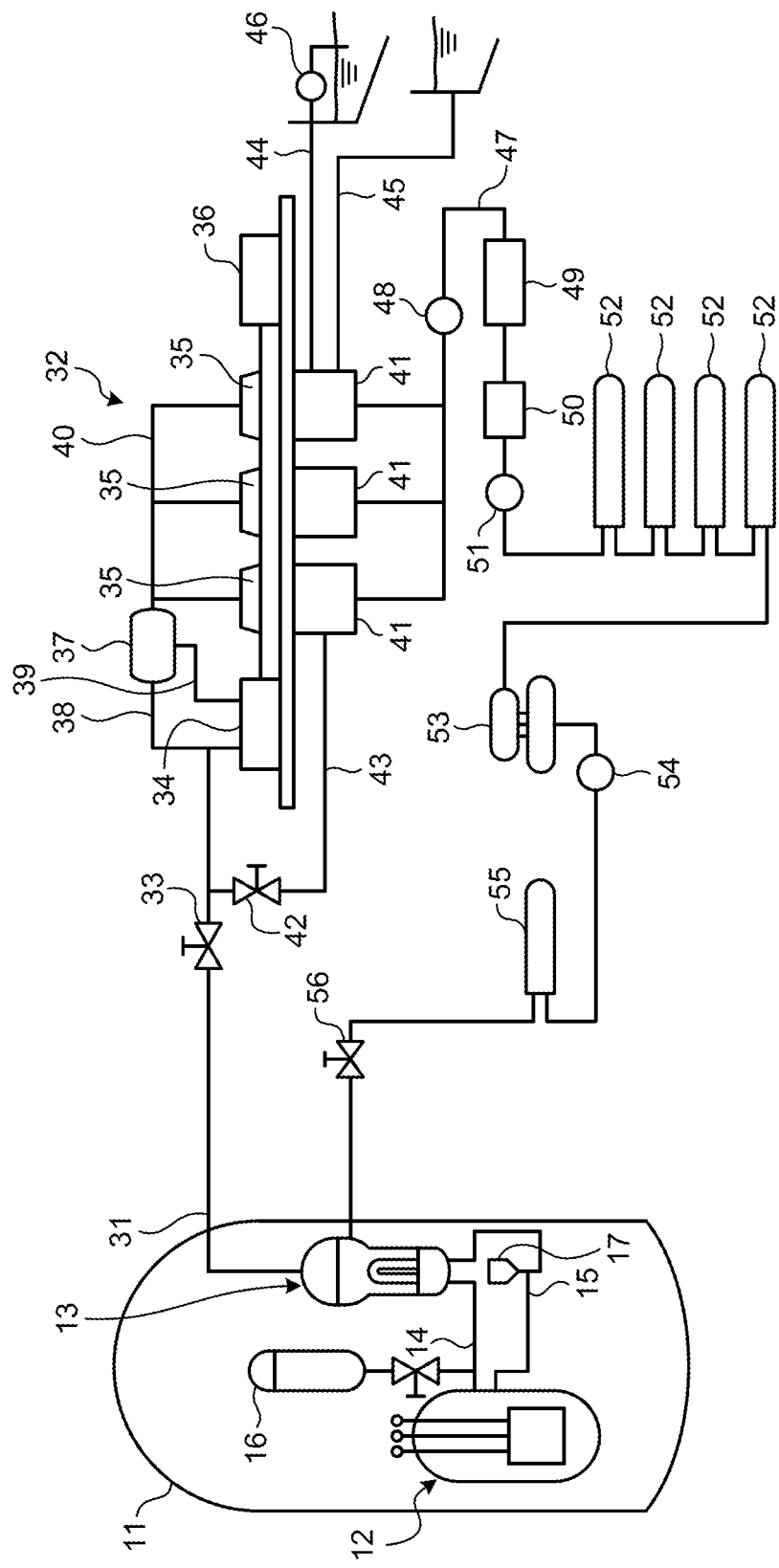
FIG. 2 is a schematic configuration diagram of a nuclear power plant.
Figure 3:
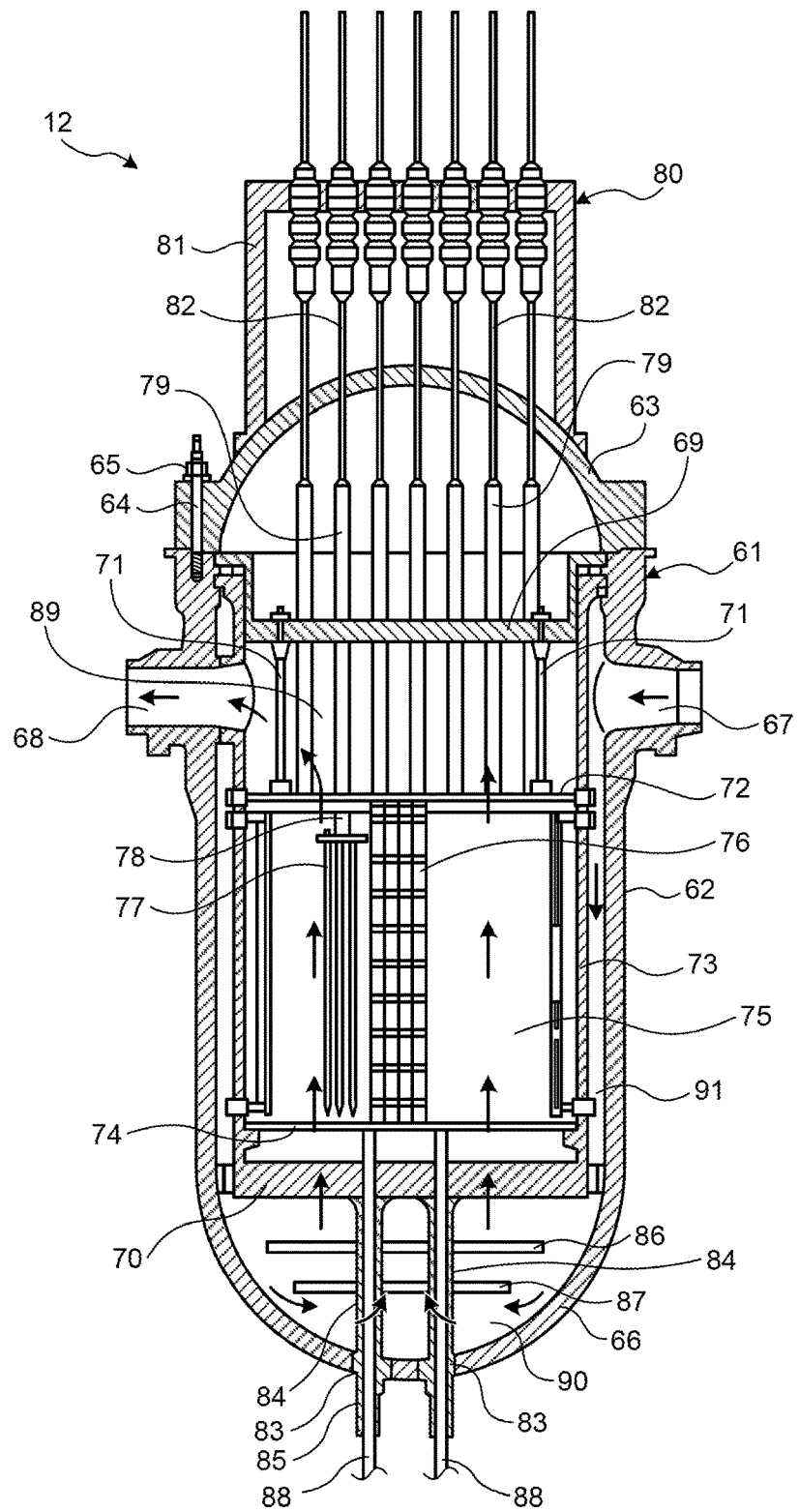
FIG. 3 is a longitudinal sectional view illustrating a pressurized water reactor.

FIG. 2 is a schematic configuration diagram of a nuclear power plant, and FIG. 3 is a longitudinal sectional view illustrating a pressurized water reactor.

A nuclear reactor of the embodiment is a pressurized water reactor (PWR) that uses light water as a nuclear reactor coolant and a neutron moderator while keeping the light water as high-temperature and high-pressure water which is not boiled throughout a reactor core, sends the high-temperature and high-pressure water to a vapor generator so as to generate a vapor by a heat exchange operation, and sends the vapor to a turbine generator so as to generate electric power.

In a nuclear power plant that includes the pressurized water reactor of the embodiment, as illustrated in FIG. 2, a containment 11 accommodates a pressurized water reactor 12 and a vapor generator 13 therein. Here, the pressurized water reactor 12 and the vapor generator 13 are connected to a high-temperature-side supply pipe 14 through a low-temperature-side supply pipe 15, the high-temperature-side supply pipe 14 is provided with a pressurizer 16, and the low-temperature-side supply pipe 15 is provided with a primary cooling water pump 17. In this case, light water is used as a moderator and primary cooling water (coolant), and a primary cooling system is controlled at a high-pressure state of about 150 to 160 atm by the pressurizer 16 in order to prevent the primary cooling water from being boiled in the reactor core portion.

Accordingly, in the pressurized water reactor 12, the light water as the primary cooling water is heated by low-enriched uranium or MOX as a fuel (an atomic fuel), and the high-temperature primary cooling water is sent to the vapor generator 13 through the high-temperature-side supply pipe 14 while being maintained at a predetermined high pressure by the pressurizer 16. In the vapor generator 13, the primary cooling water which is cooled by a heat exchange operation between the high-temperature and high-pressure primary cooling water and the secondary cooling water is returned to the pressurized water reactor 12 through the low-temperature-side supply pipe 15.

The vapor generator 13 is connected to a vapor turbine 32 through a pipe 31 that supplies the heated secondary cooling water, that is, vapor, and the pipe 31 is provided with a main vapor isolation valve 33. The vapor turbine 32 includes a high-pressure turbine 34 and a low-pressure turbine 35, and is connected to a generator (a generation device) 36. Further, a moisture separation heater 37 is provided between the high-pressure turbine 34 and the low-pressure turbine 35. Here, a cooling water branch pipe 38 which is branched from the pipe 31 is connected to the moisture separation heater 37, the high-pressure turbine 34 and the moisture separation heater 37 are connected to each other by a low-temperature reheating pipe 39, and the moisture separation heater 37 and the low-pressure turbine 35 are connected to each other by a high-temperature reheating pipe 40.

Further, the low-pressure turbine 35 of the vapor turbine 32 includes a condenser 41. Here, the condenser 41 is connected to a turbine bypass pipe 43 which extends from the pipe 31 and includes a bypass valve 42, and is connected to a water intake pipe 44 and a drainage pipe 45 which supply and discharge the cooling water (for example, sea water). The water intake pipe 44 includes a circulation water pump 46, and the other end thereof is disposed under the sea along with the drainage pipe 45.

Then, the condenser 41 is connected to a pipe 47, a condensate pump 48, a grand condenser 49, a condensed water desalting device 50, a condensate booster pump 51, and a low-pressure feed water heater 52. Further, the pipe 47 is connected to a deaerator 53, and is provided with a water feeding pump 54, a high-pressure feed water heater 55, and a water feeding control valve 56.

Accordingly, in the vapor generator 13, the vapor which is generated by the heat exchange operation with respect to the high-pressure and high-temperature primary cooling water is sent to the vapor turbine 32 (from the high-pressure turbine 34 to the low-pressure turbine 35) through the pipe 31. Then, the vapor turbine 32 is driven by the vapor so that the generator 36 generates electric power. At this time, the vapor which is sent from the vapor generator 13 is used to drive the high-pressure turbine 34, passes through the moisture separation heater 37 so that the vapor is heated while a moisture contained in the vapor is removed, and is used to drive the low-pressure turbine 35. Then, the vapor having been used to drive the vapor turbine 32 is cooled into condensed water by the sea water in the condenser 41, and is returned to the vapor generator 13 through the grand condenser 49, the condensed water desalting device 50, the low-pressure feed water heater 52, the deaerator 53, the high-pressure feed water heater 55, and the like.

In the pressurized water reactor 12 of the nuclear power plant with such a configuration, as illustrated in FIG. 3, a nuclear reactor vessel 61 includes a nuclear reactor vessel body 62 and a nuclear reactor vessel head (an upper end plate) 63 attached to the upper portion thereof so that an in-core structure is inserted thereinto, and the nuclear reactor vessel head 63 is fixed to the nuclear reactor vessel body 62 by a plurality of stud bolts 64 and a plurality of nuts 65 so as to be opened and closed.

The nuclear reactor vessel body 62 has a cylindrical shape of which the upper portion is opened by the separation of the nuclear reactor vessel head 63 and the lower portion is formed in a semi-spherical shape while being closed by a lower end plate 66. Then, the upper portion of the nuclear reactor vessel body 62 is provided with an inlet nozzle (an entrance nozzle) 67 which supplies the light water (coolant) as the primary cooling water and an outlet nozzle (an exist nozzle) 68 which discharges the light water. Further, the nuclear reactor vessel body 62 is provided with a water injection nozzle (a water injection nozzle) (not illustrated) separately from the inlet nozzle 67 and the outlet nozzle 68.

In the inside of the nuclear reactor vessel body 62, an upper core support 69 is fixed to a portion above the inlet nozzle 67 and the outlet nozzle 68 and a lower core support 70 is fixed so as to be located in the vicinity of the lower end plate 66. The upper core support 69 and the lower core support 70 are formed in a disk shape and are provided with a plurality of flow holes (not illustrated). Then, the upper core support 69 is connected to an upper core plate 72 provided with a plurality of flow holes (not illustrated) at a lower portion thereof through a plurality of reactor core support rods 71.

A core barrel 73 which has a cylindrical shape is disposed inside the nuclear reactor vessel body 62 with a predetermined gap with respect to the inner wall surface. Further, the upper portion of the core barrel 73 is connected to the upper core plate 72, and the lower portion thereof is connected to a lower core support plate 74 having a disk shape and a plurality of flow holes (not illustrated) formed therein. Then, the lower core support plate 74 is supported by the lower core support 70. That is, the core barrel 73 is suspended on the lower core support 70 of the nuclear reactor vessel body 62.

The reactor core 75 is formed by the upper core plate 72, the core barrel 73, and the lower core support plate 74, and the reactor core 75 has a plurality of fuel assemblies 76 disposed therein. Although not illustrated in the drawings, each of the fuel assemblies 76 is formed by binding a plurality of fuel rods in a grid shape by a support grid. Here, the upper nozzle is fixed to the upper end, and the lower nozzle is fixed to the lower end. Further, the reactor core 75 has a plurality of control rods 77 disposed therein. The plurality of control rods 77 is formed as a control rod cluster 78 while the upper ends are evenly arranged, and is insertable into the fuel assembly 76. In the upper core support 69, a plurality of control rod cluster guide pipes 79 is fixed while penetrating the upper core support 69, and each control rod cluster guide pipe 79 is formed so that the lower end thereof extends to the control rod cluster 78 inside the fuel assembly 76.

The upper portion of the nuclear reactor vessel head 63 that constitutes the nuclear reactor vessel 61 is formed in a semi-spherical shape, and a magnetic jack type control rod driving mechanism 80 is accommodated in a housing 81 which is integrated with the nuclear reactor vessel head 63. The plurality of control rod cluster guide pipes 79 is formed so that the upper ends thereof extend to the control rod driving mechanism 80, and control rod cluster driving shafts 82 which extend from the control rod driving mechanism 80 extend to the fuel assemblies 76 while passing through the inside of the control rod cluster guide pipes 79, thereby gripping the control rod cluster 78.

The control rod driving mechanism 80 extends in the vertical direction so as to be connected to the control rod cluster 78, and a control rod cluster driving shaft 82 of which the surface is provided with a plurality of circumferential grooves formed in the longitudinal direction is moved in the vertical direction by the magnetic jack, thereby controlling the output of the nuclear reactor.

Further, the nuclear reactor vessel body 62 is provided with a plurality of instrumentation nozzles 83 which penetrates the lower end plate 66, and each of the instrumentation nozzles 83 is formed so that the upper end inside the reactor is connected to the in-core instrumentation guide pipe 84 and the lower end outside the reactor is connected to a conduit tube 85. In each of the in-core instrumentation guide pipes 84, the upper end is connected to the lower core support 70 and upper and lower connection plates 86 and 87 for suppressing a vibration are connected to the in-core instrumentation guide pipes. A thimble pipe 88 is provided with a neutron flux detector (not illustrated) capable of measuring a neutron flux, and is insertable to the fuel assembly 76 while penetrating the lower core support plate 74 from the conduit tube 85 along the instrumentation nozzle 83 and the in-core instrumentation guide pipe 84.

Accordingly, the nuclear fission inside the reactor core 75 is controlled in a manner such that the control rod cluster driving shaft 82 is moved by the control rod driving mechanism 80 so as to extract the control rod 77 from the fuel assembly 76 by a predetermined amount. Then, the light water charged into the nuclear reactor vessel 61 is heated by the generated thermal energy, and the high-temperature light water is discharged from the outlet nozzle 68 so as to be sent to the vapor generator 13 as described above. That is, neutrons are discharged by the nuclear fission of the atomic fuel forming the fuel assembly 76, and the light water as the moderator and the primary cooling water decreases the movement energy of the discharged high-speed neutrons so as to form thermal neutrons. Accordingly, new nuclear fission may easily occur, and the generated heat is stolen and cooled. Meanwhile, when the control rod 77 is inserted into the fuel assembly 76, the number of neutrons generated inside the reactor core 75 may be adjusted. Further, when the entire control rod 77 is inserted into the fuel assembly 76, the nuclear reactor may be emergently stopped.

Further, the nuclear reactor vessel 61 is formed so that an upper plenum 89 communicating with the outlet nozzle 68 is provided above the reactor core 75 and a lower plenum 90 is provided therebelow. Then, a down comer portion 91 which communicates with the inlet nozzle 67 and the lower plenum 90 is formed between the nuclear reactor vessel 61 and the core barrel 73. Accordingly, the light water flows from the inlet nozzle 67 into the nuclear reactor vessel body 62, flows downward to the down comer portion 91, reaches the lower plenum 90, rises while being guided upward by the spherical inner surface of the lower plenum 90, passes through the lower core support 70 and the lower core support plate 74, and flows into the reactor core 75. The light water which flows into the reactor core 75 increases in temperature while cooling the fuel assembly 76 by absorbing the thermal energy generated from the fuel assembly 76 constituting the reactor core 75, passes through the upper core plate 72, rises to the upper plenum 89, and is discharged through the outlet nozzle 68.

In the nuclear reactor vessel 61 with such a configuration, the instrumentation nozzle 83 is formed in a manner such that the in-core instrumentation cylinder is fitted into an attachment hole formed in the lower end plate 66 of the nuclear reactor vessel body 62 and the upper end of the in-core instrumentation cylinder is fixed to the inner surface of the lower end plate 66 by groove-welding. In this case, the nuclear reactor vessel body 62 is formed by butteredwelding a stainless steel to the inner surface of low-alloy steel as a base material, and the in-core instrumentation cylinder of the nickel base alloy is welded to the nuclear reactor vessel body 62 by the material of the nickel base alloy while being fitted into the attachment hole of the nuclear reactor vessel body 62. For that reason, there is a possibility that a stress corrosion crack may occur in the in-core instrumentation cylinder due to the long-term use. Thus, when the stress corrosion crack occurs, there is a need to repair the instrumentation nozzle 83. However, since the nuclear reactor vessel body 62 is formed of low-alloy steel, a heat treatment for removing a stress is needed after the welding operation. However, the heat treatment is difficult in that the inside of the nuclear reactor vessel body is a high radiation field.

Therefore, a nozzle repair method of the first embodiment includes removing a connection portion with respect to the in-core instrumentation cylinder in the groove-welding portion, removing the in-core instrumentation cylinder from the lower end plate 66, processing the plug attachment portion by removing the groove-welding portion, applying a pressing load to the lower end plate 66 by attaching a plug to the plug attachment portion, and fixing the plug attached to the plug attachment portion by welding. At this time, since the plug is fixed by removing the groove-welding portion and the in-core instrumentation cylinder, the instrumentation nozzle 83 may not be used. Since the nuclear reactor vessel 61 is provided with a plurality of instrumentation nozzles 83, even when a small number of instrumentation nozzles 83 may not be used, the other instrumentation nozzles 83 may be used. Accordingly, since the repair operation may be easily performed compared to the case when the instrumentation nozzle 83 is repaired, the workability may be improved and the repair cost may be decreased. Further, since the plug is attached to the plug attachment portion and is welded thereto while the pressing load is applied to the lower end plate 66, it is possible to prevent a problem in which a gap is formed between the plug and the plug attachment portion even when the plug heated by welding is cooled. Accordingly, it is possible to highly precisely fix the plug to the plug attachment portion in a close contact state.

Figure 1:
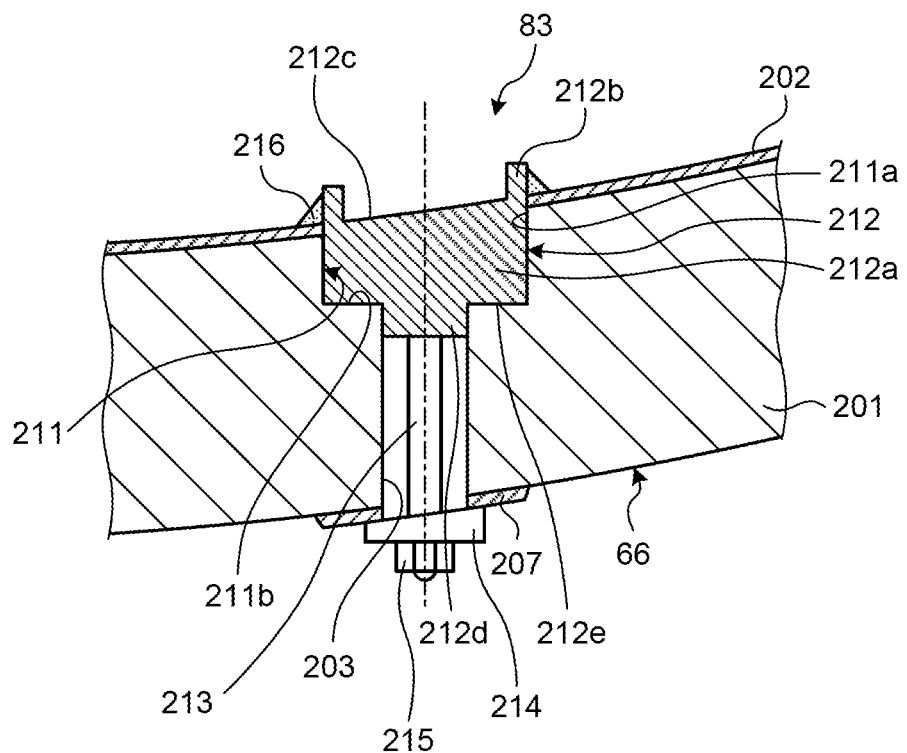
FIG. 1 is a cross-sectional view illustrating an instrumentation nozzle of a nuclear reactor vessel that is repaired by a nozzle repair method according to a first embodiment of the invention.
Figure 4:
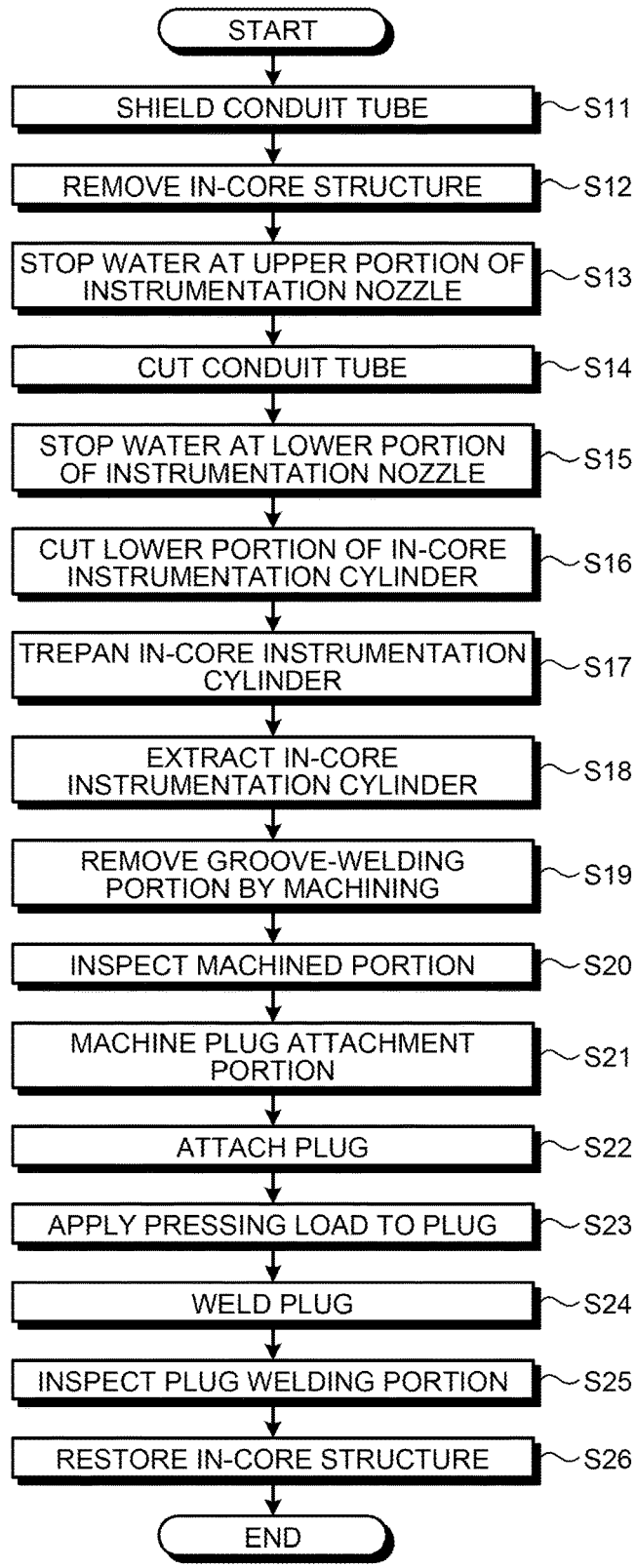
FIG. 4 is a flowchart illustrating the nozzle repair method of the first embodiment.
Figure 5:
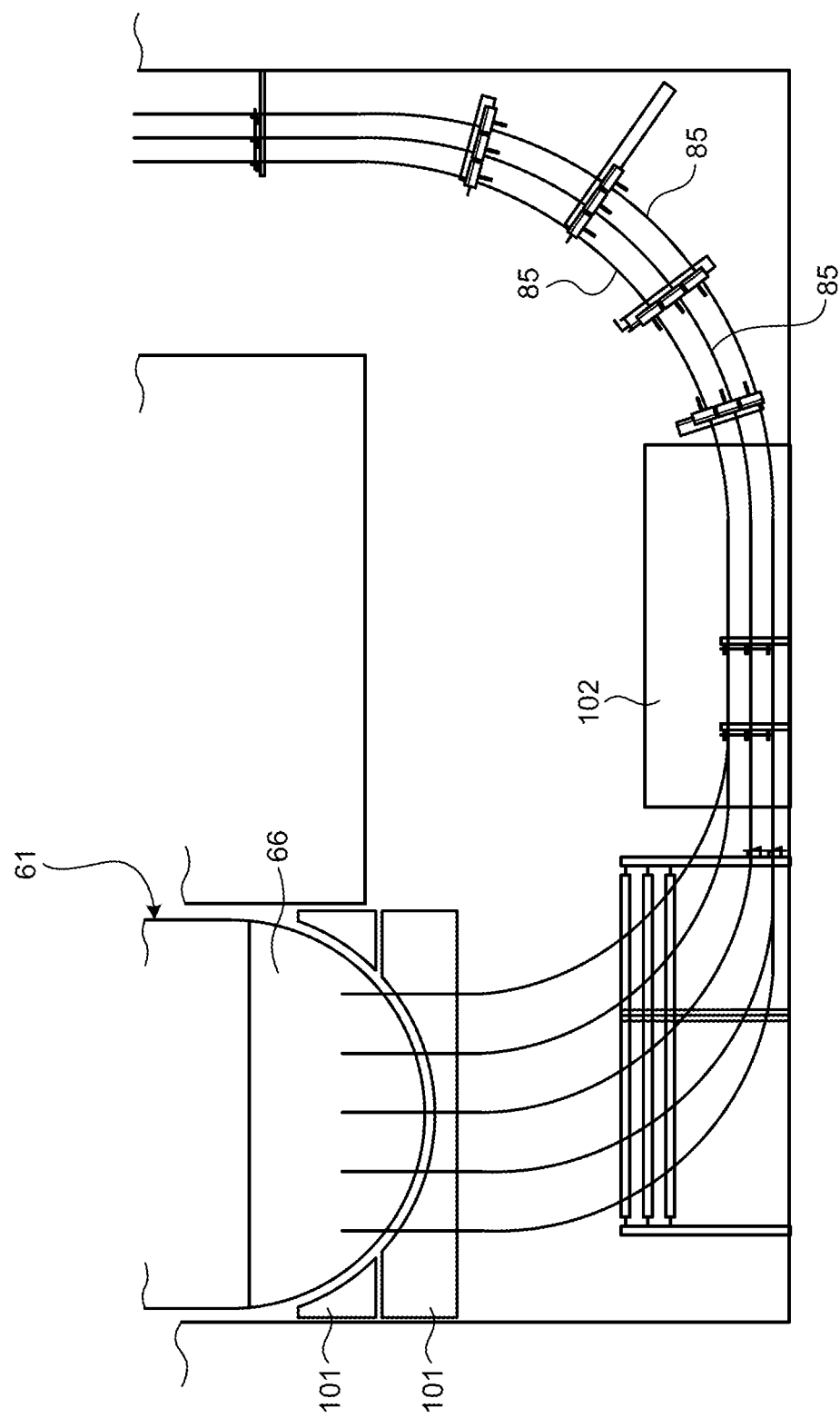
FIG. 5 is a schematic diagram illustrating an operation of drawing a thimble tube.
Figure 6:
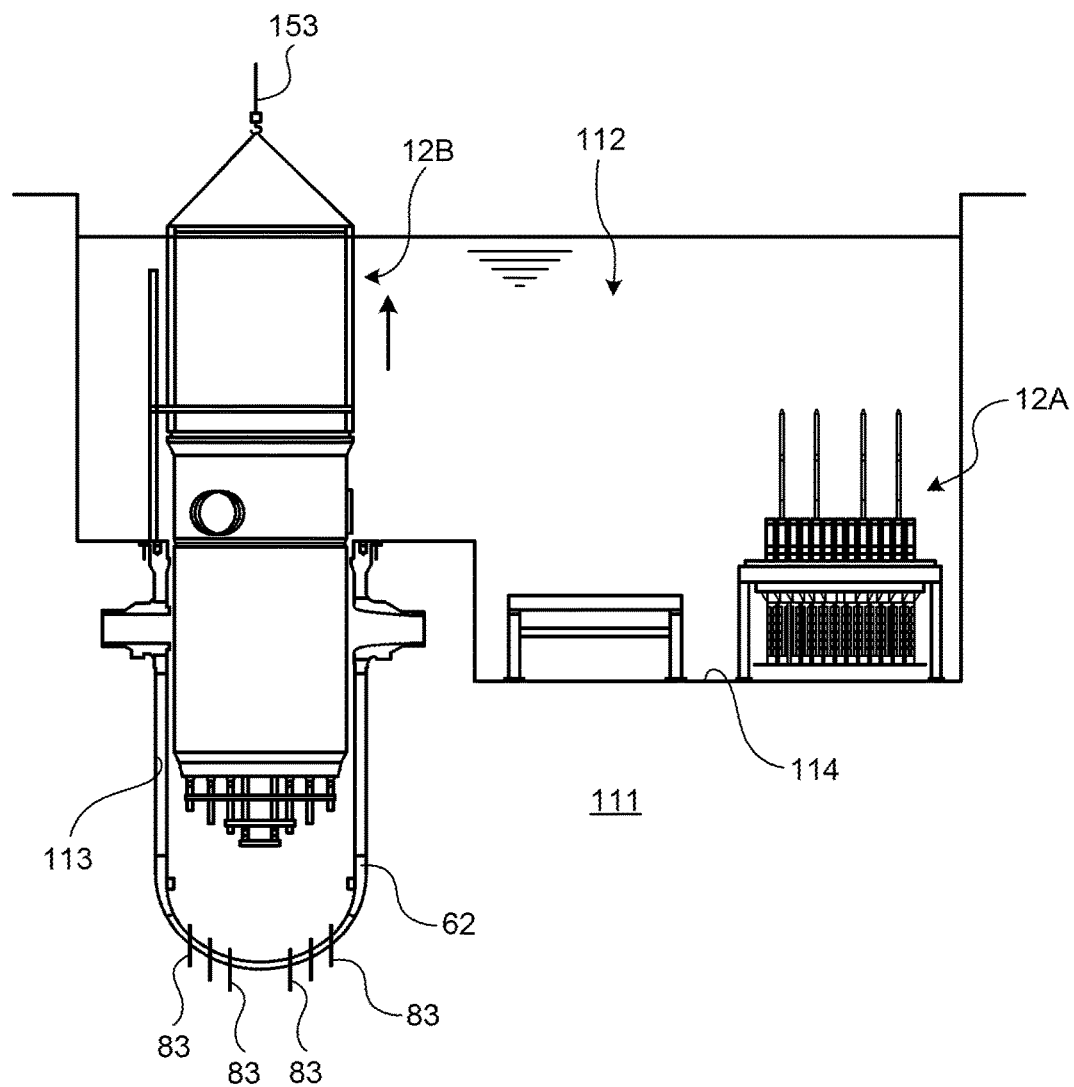
FIG. 6 is a schematic diagram illustrating an operation of removing an in-core structure from the nuclear reactor vessel.
Figure 7:
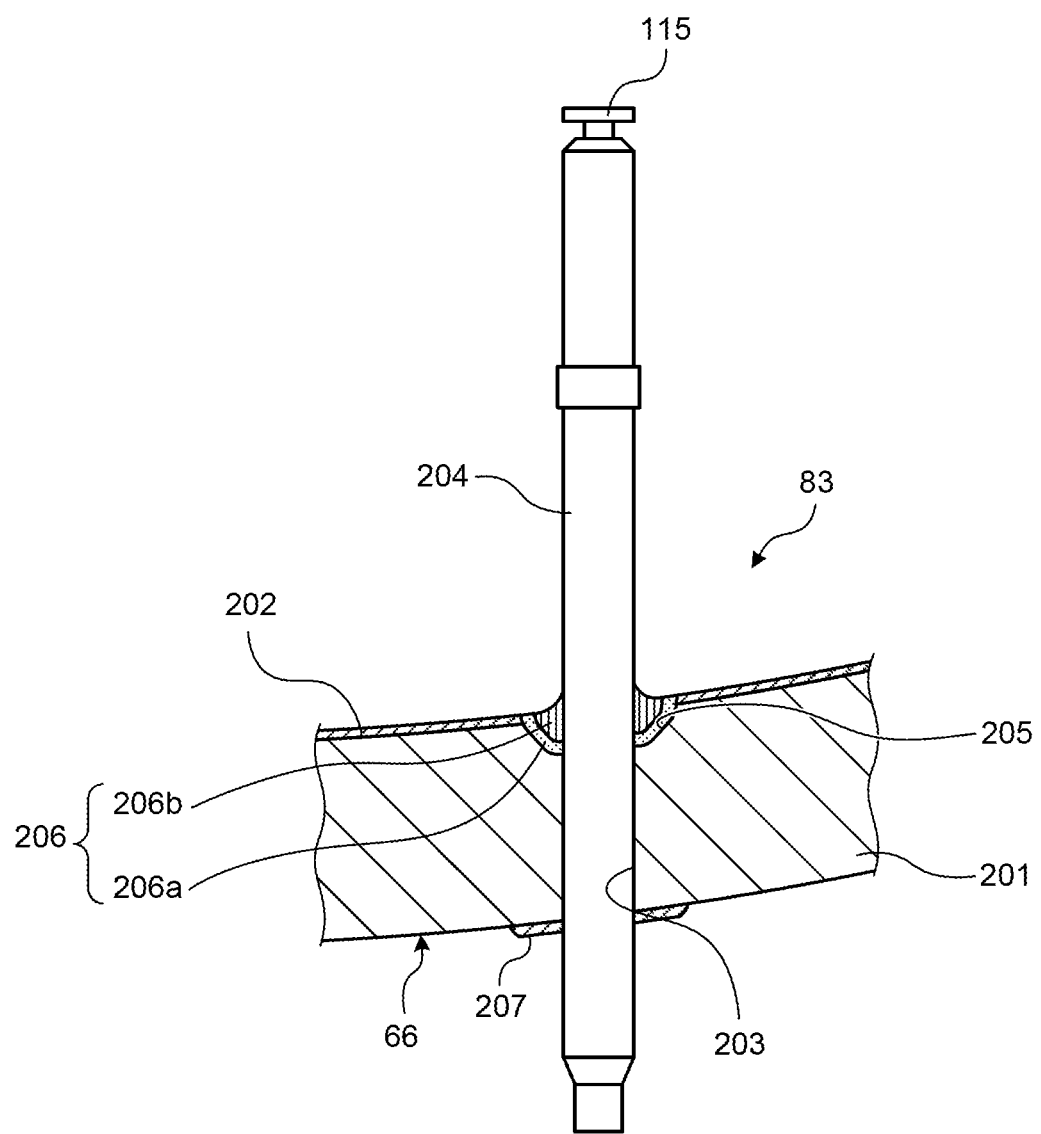
FIG. 7 is a schematic diagram illustrating the water stopping operation for the in-core instrumentation cylinder.
Figure 8:
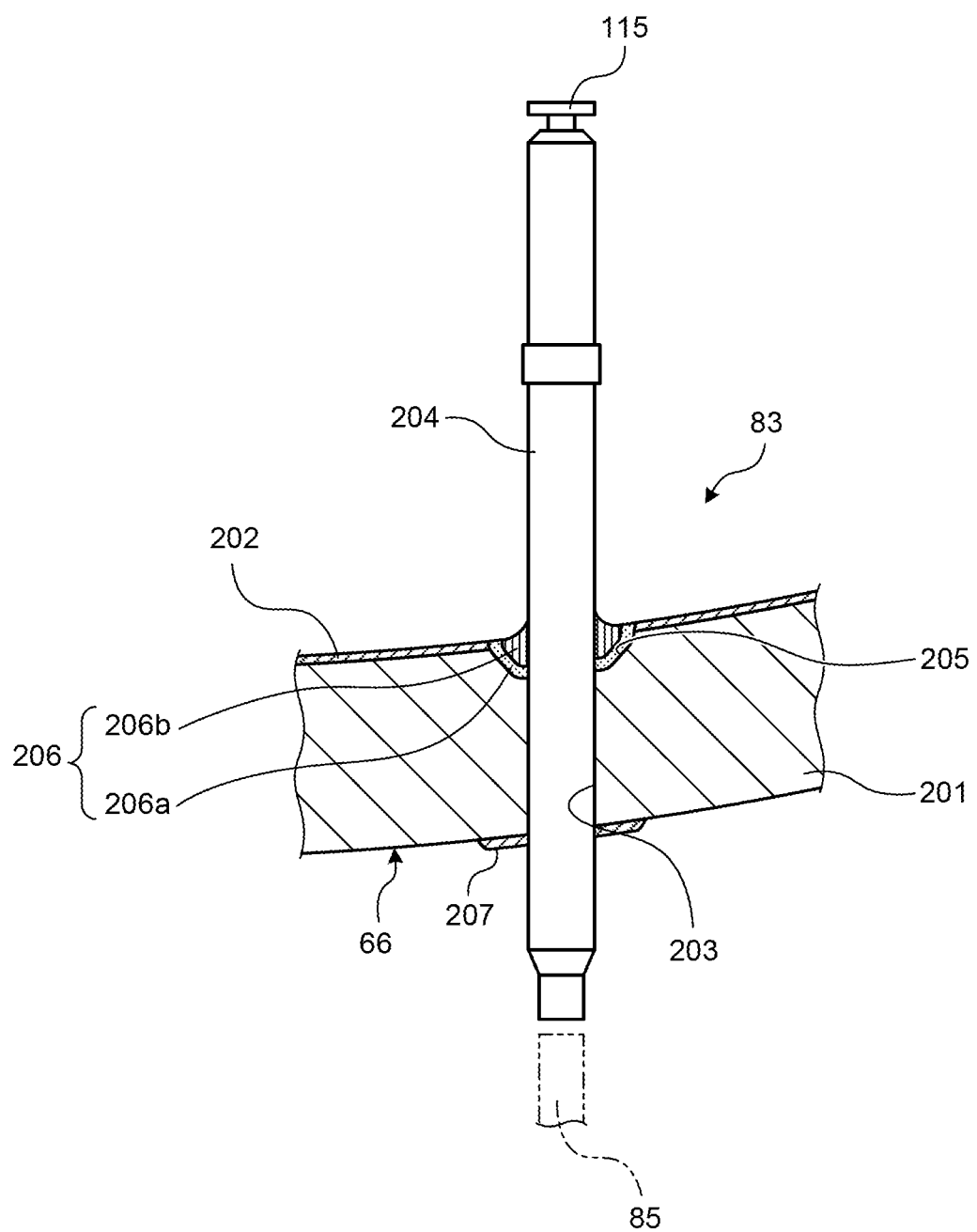
FIG. 8 is a schematic diagram illustrating a conduit tube cutting operation.
Figure 9:
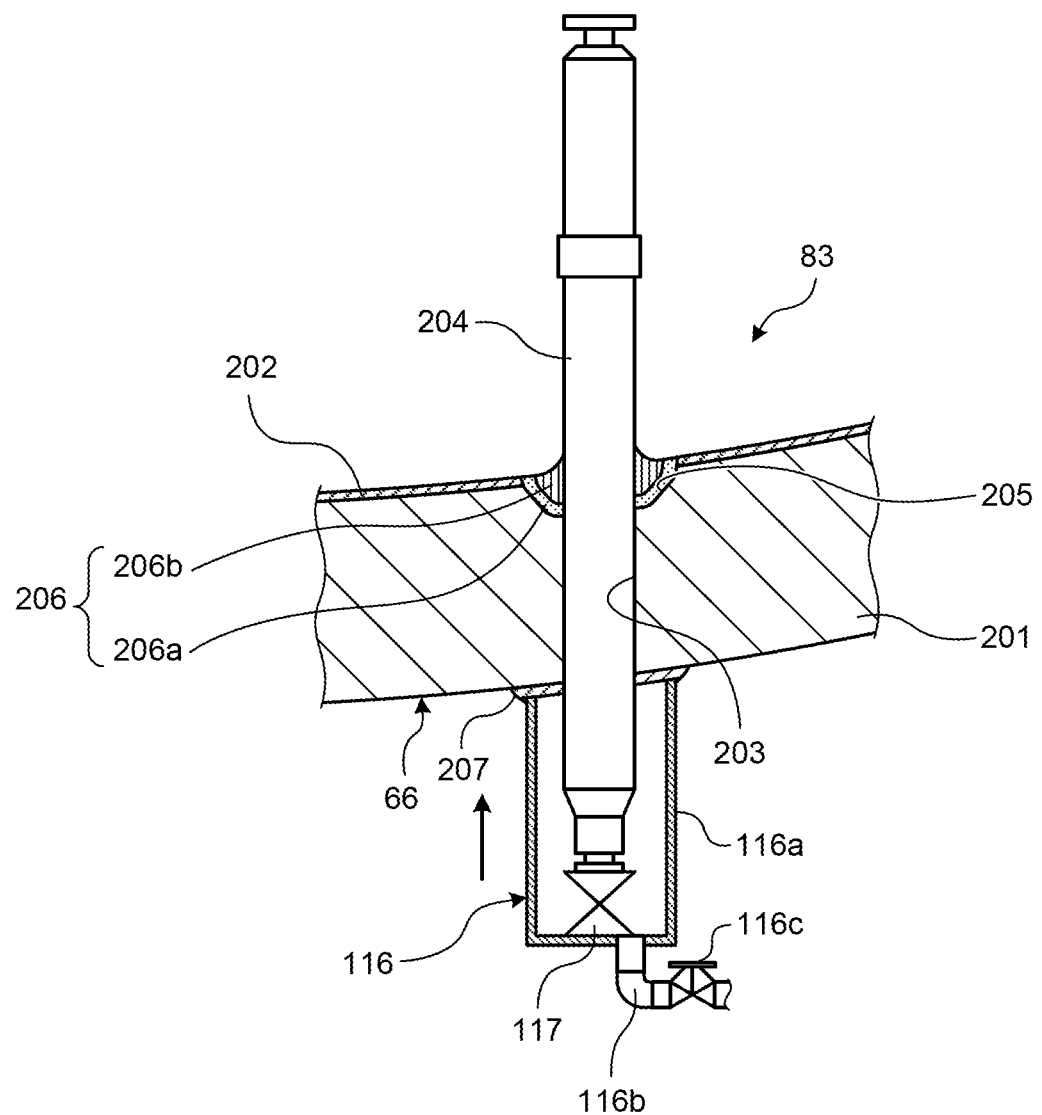
FIG. 9 is a schematic diagram illustrating a water stopping cap attachment operation.
Figure 10:
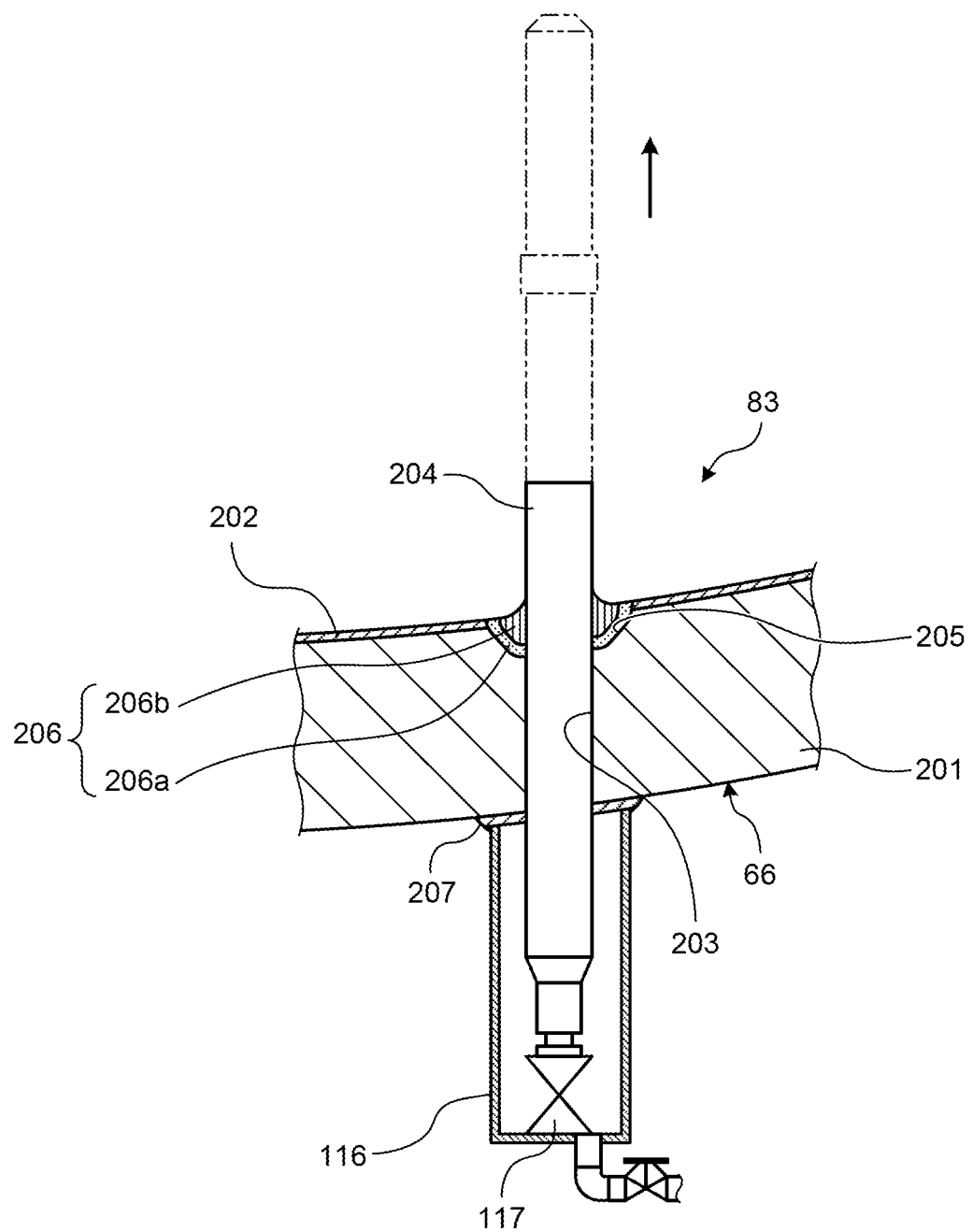
FIG. 10 is a schematic diagram illustrating a cutting operation for the in-core instrumentation cylinder.
Figures 1, 11:
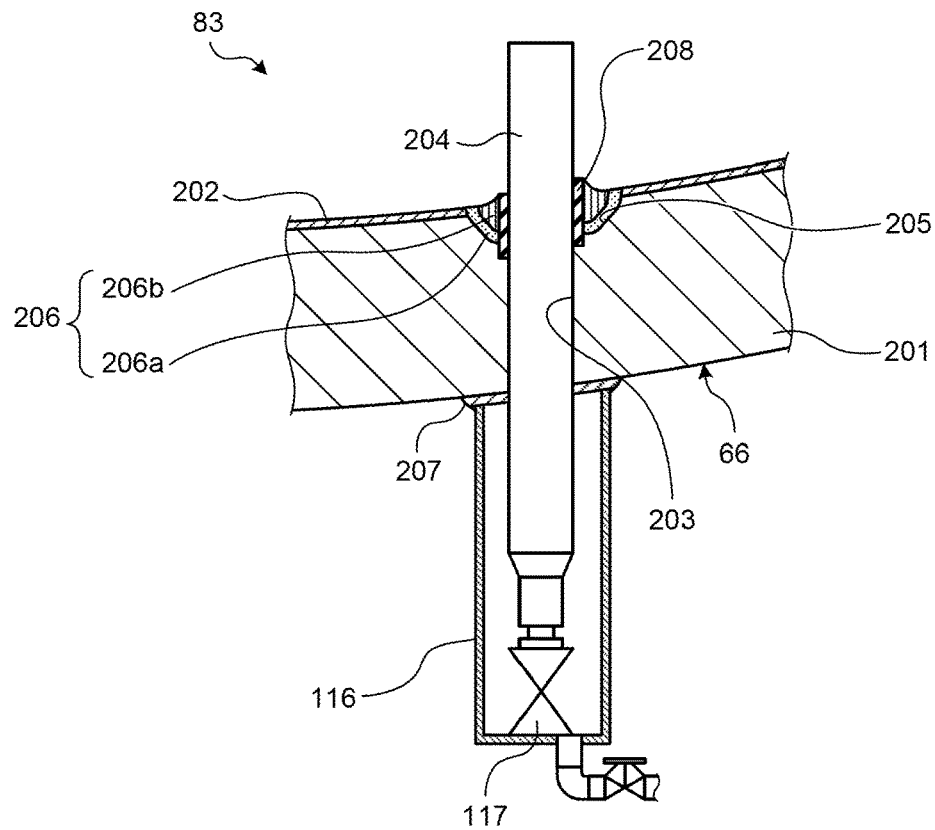
Figures 2, 11:
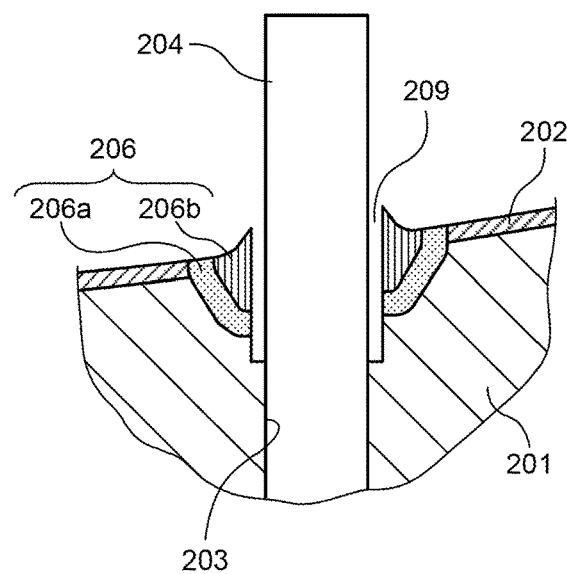
Figure 12:
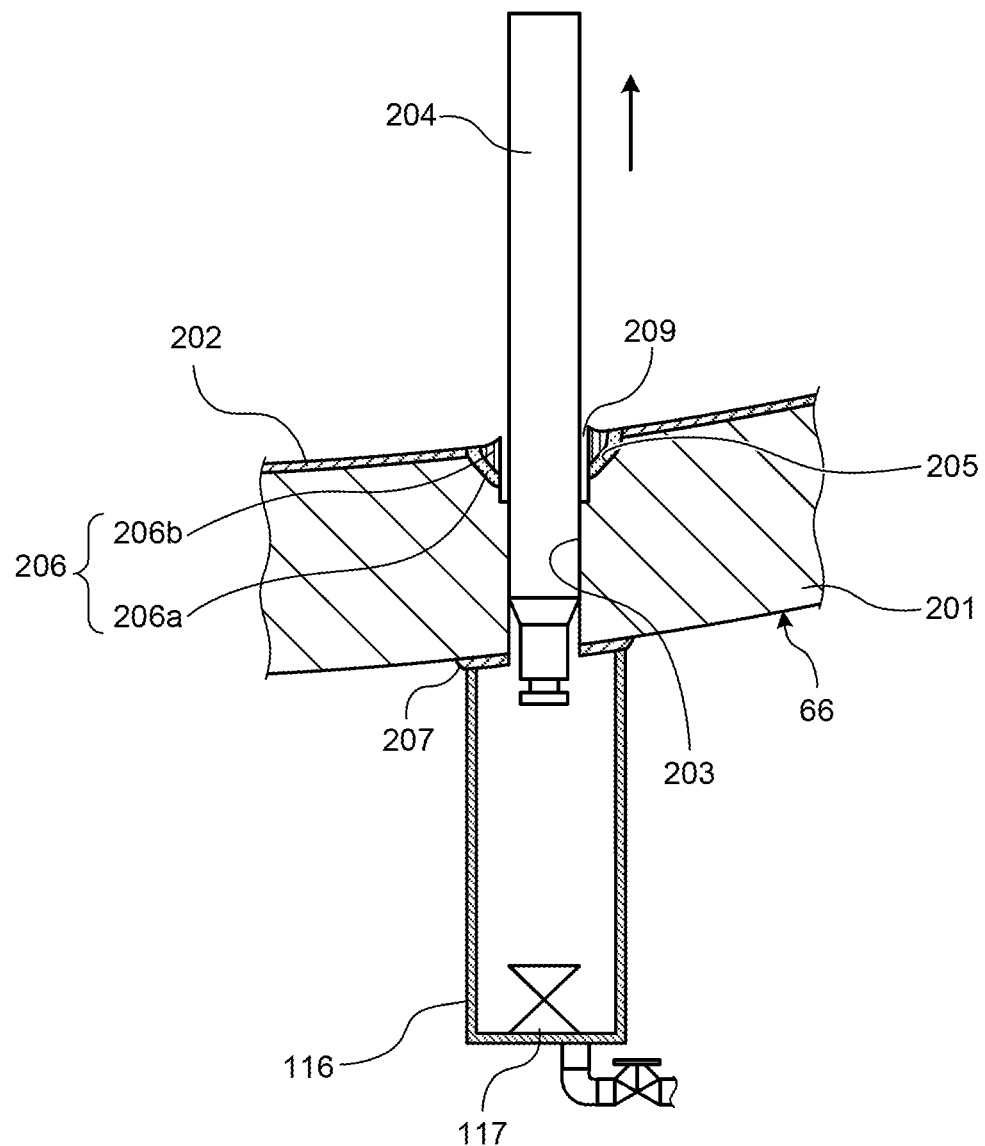
FIG. 12 is a cross-sectional view illustrating a drawing operation in the in-core instrumentation cylinder.
Figure 13:
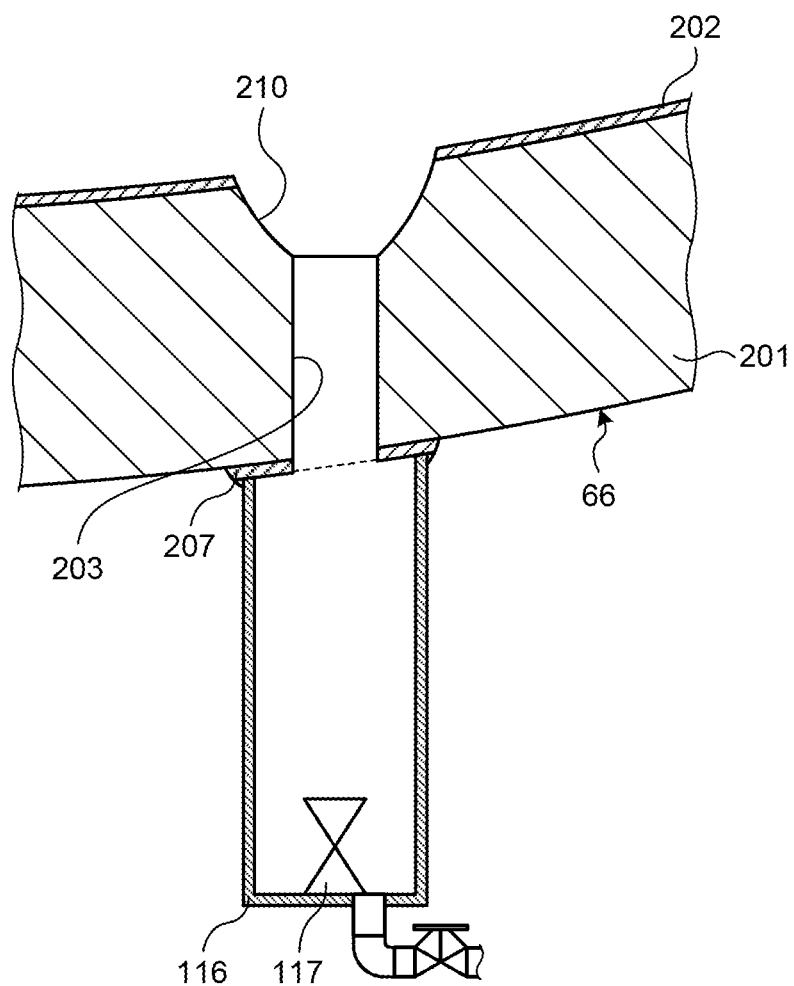
FIG. 13 is a schematic diagram illustrating an operation of machining a groove-welding portion in the instrumentation nozzle.
Figure 14:
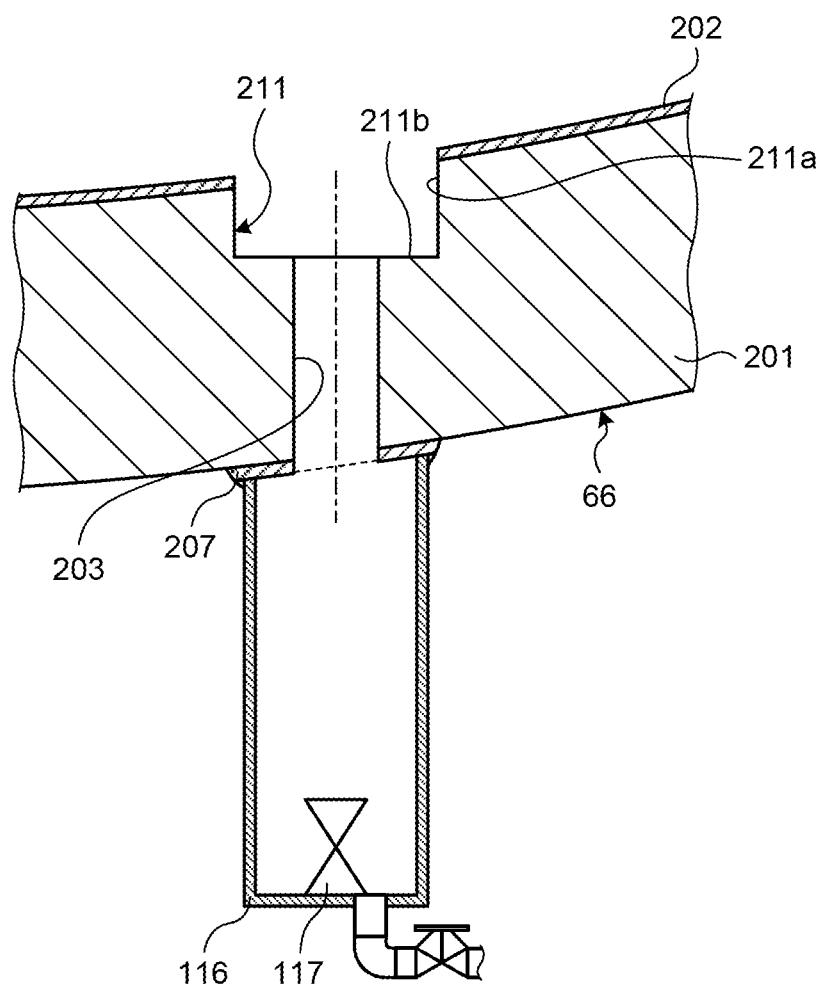
FIG. 14 is a schematic diagram illustrating an operation of machining a plug attachment portion in the instrumentation nozzle.
Figure 15:
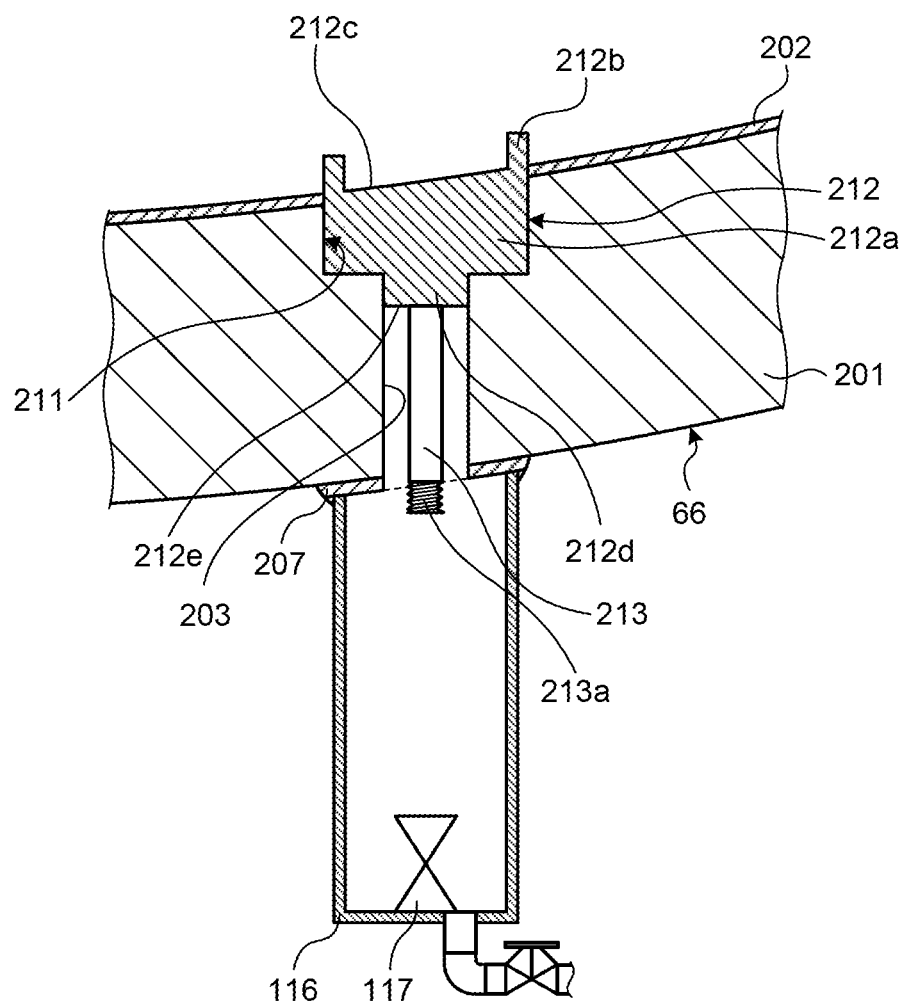
FIG. 15 is a schematic diagram illustrating an operation of attaching a plug to the instrumentation nozzle.
Figure 16:
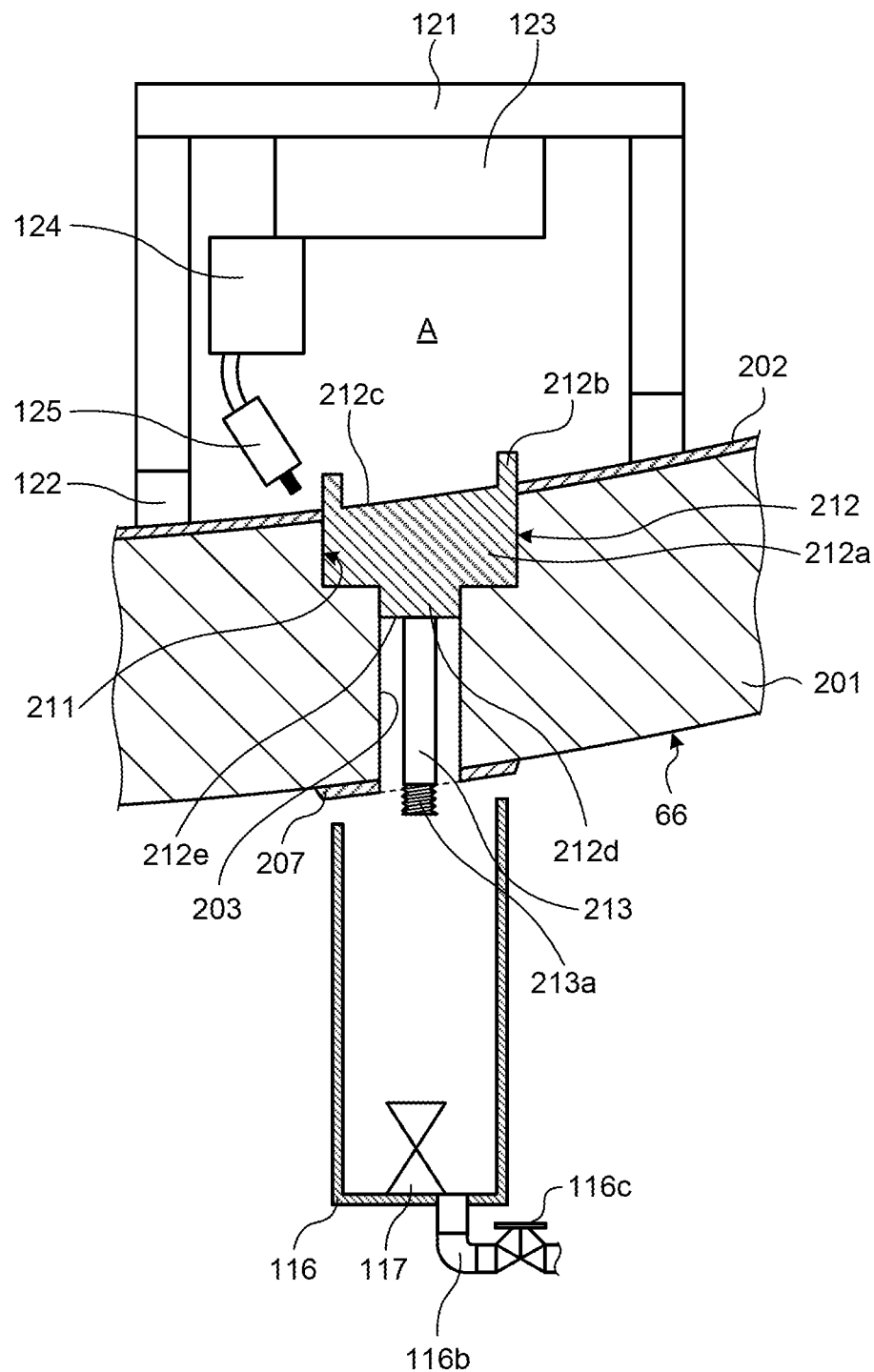
FIG. 16 is a schematic diagram illustrating an operation of attaching a housing to the instrumentation nozzle.
Figure 17:
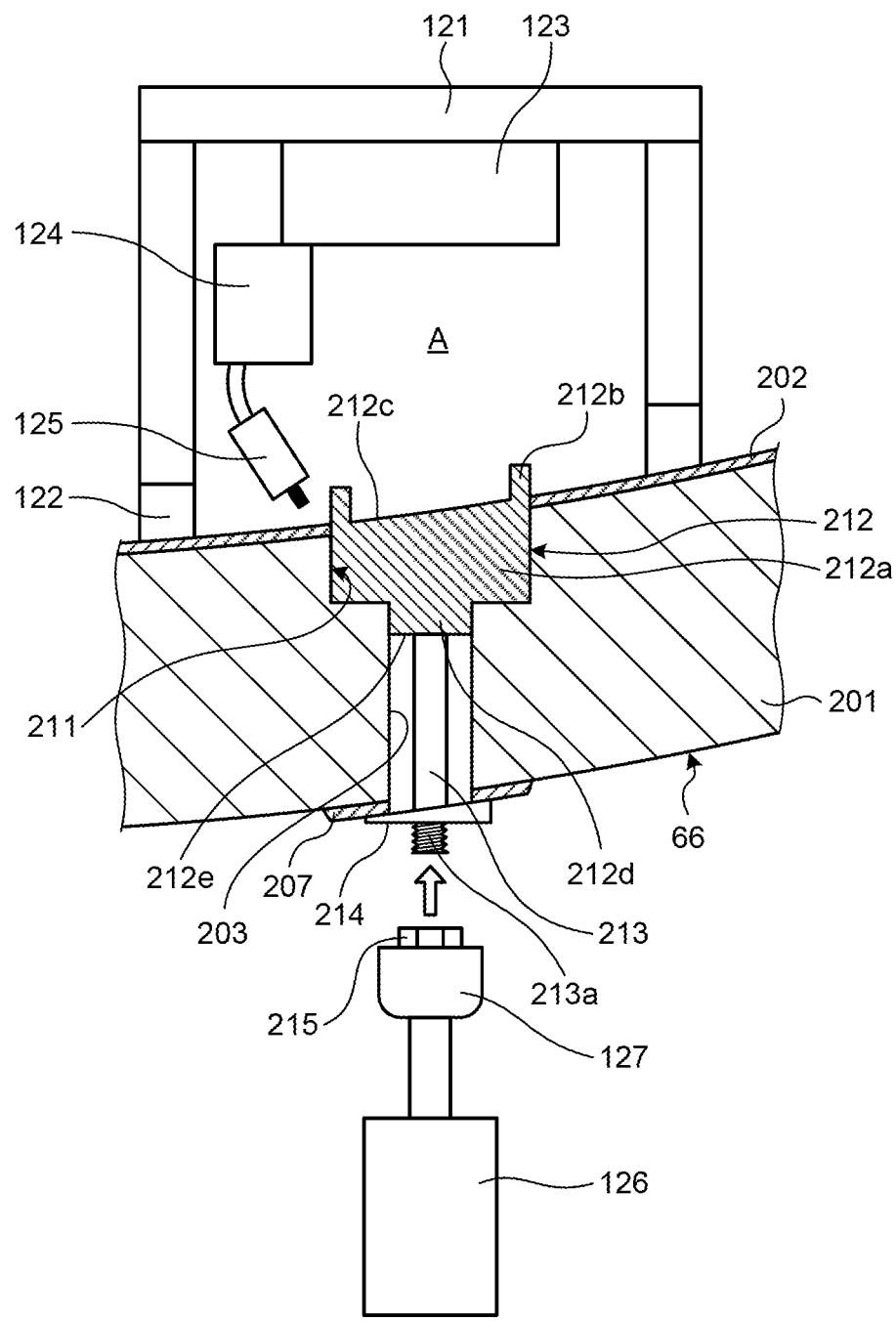
FIG. 17 is a schematic diagram illustrating an operation of applying a pressing force to the plug.
Figures 1, 18:
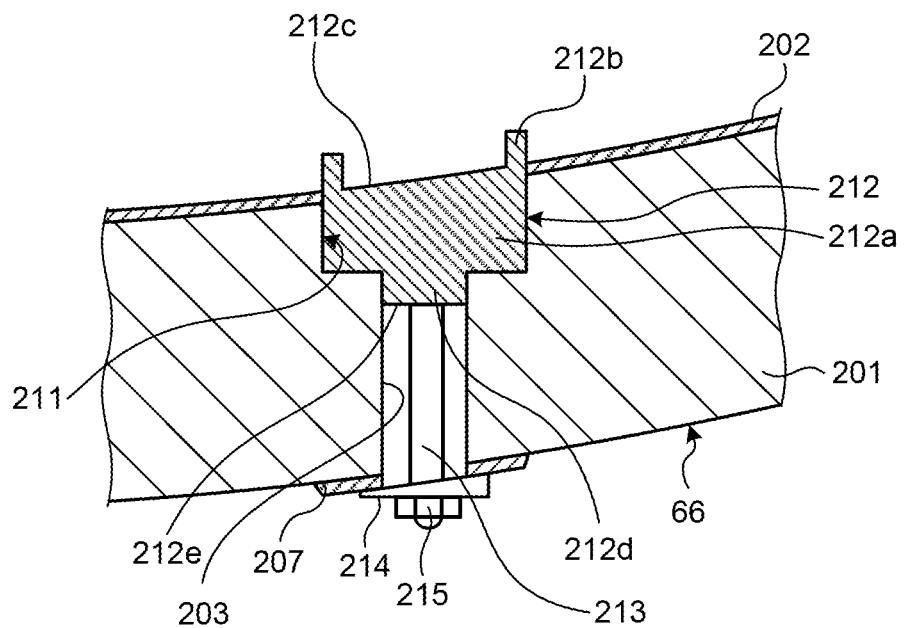
Figures 2, 18:
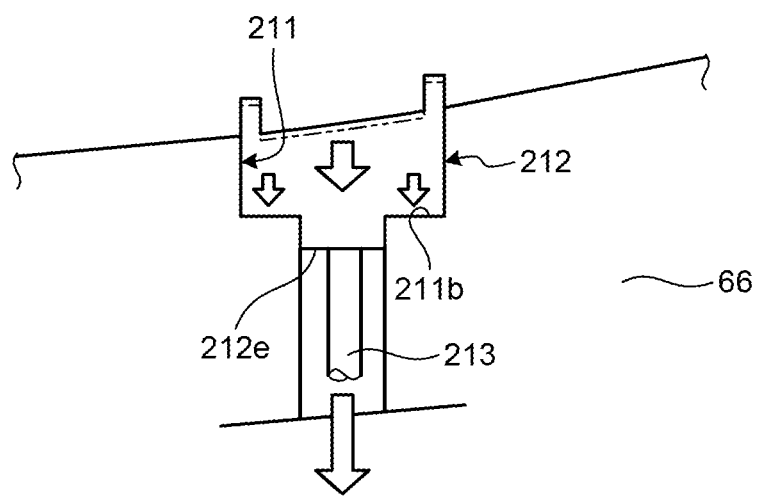
Figure 19:
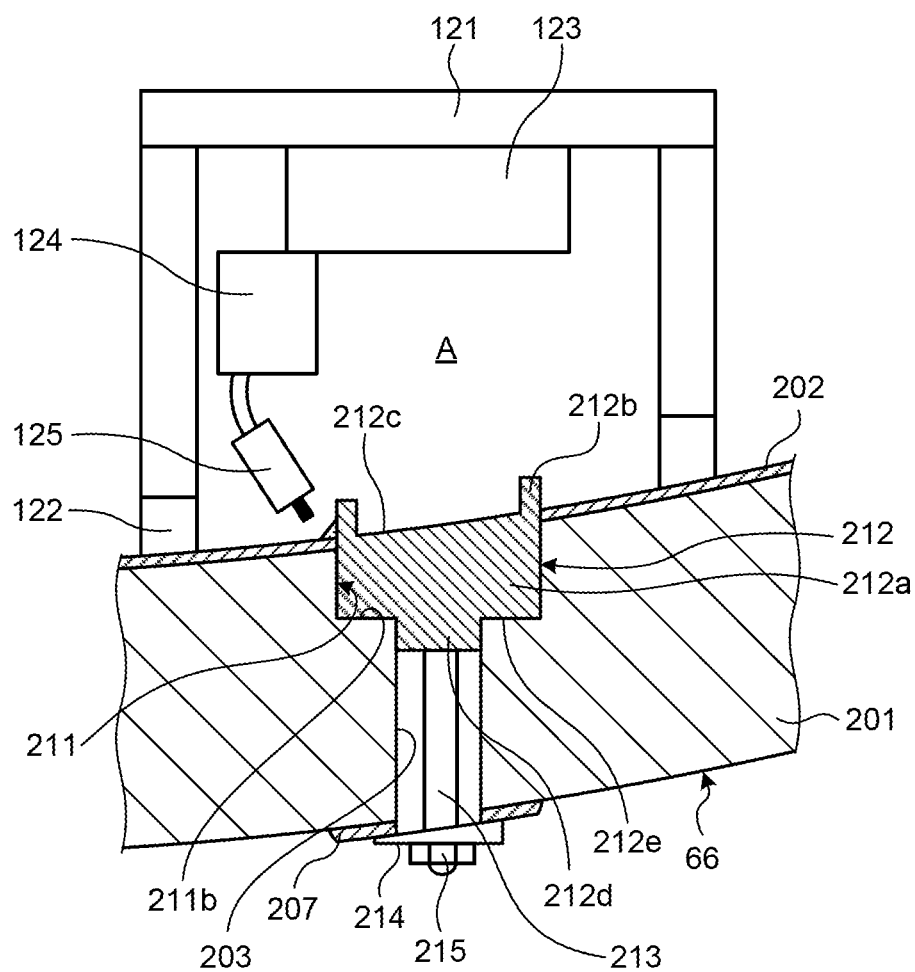
FIG. 19 is a schematic diagram illustrating an operation of welding the plug to the instrumentation nozzle.
Figure 20:
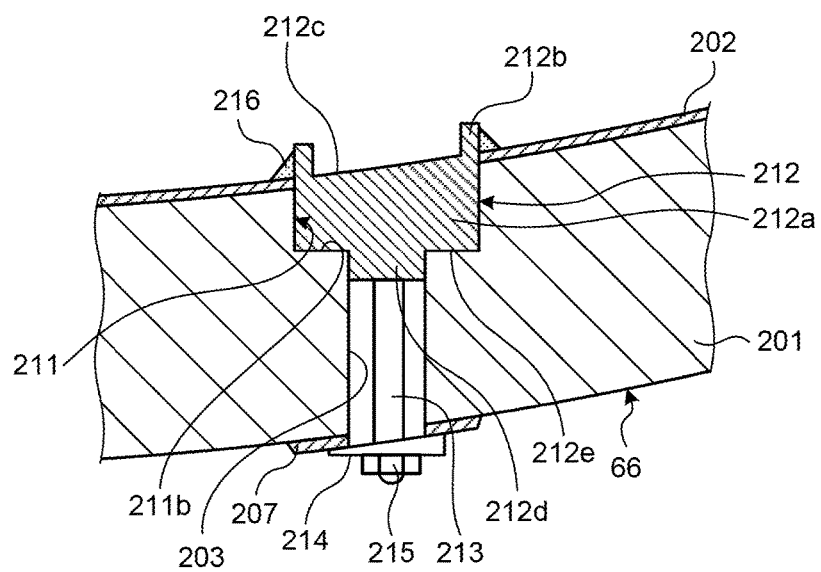
FIG. 20 is a schematic diagram illustrating the instrumentation nozzle to which the plug is welded.

FIG. 1 is a cross-sectional view illustrating an instrumentation nozzle of a nuclear reactor vessel which is repaired by a nozzle repair method according to the first embodiment of the invention, FIG. 4 is a flowchart illustrating the nozzle repair method of the first embodiment, FIG. 5 is a schematic diagram illustrating an operation of drawing a thimble tube, FIG. 6 is a schematic diagram illustrating an operation of removing an in-core structure from a nuclear reactor vessel, FIG. 7 is a schematic diagram illustrating a water stopping operation in an in-core instrumentation cylinder, FIG. 8 is a schematic diagram illustrating an operation of cutting a conduit tube, FIG. 9 is a schematic diagram illustrating an operation of attaching a water stopping cap, FIG. 10 is a schematic diagram illustrating an operation of cutting the in-core instrumentation cylinder, FIG. 11-1 is a schematic diagram illustrating an operation of trepanning the in-core instrumentation cylinder, FIG. 11-2 is a cross-sectional view illustrating the trepanned in-core instrumentation cylinder, FIG. 12 is a cross-sectional view illustrating an operation of drawing the in-core instrumentation cylinder, FIG. 13 is a schematic diagram illustrating an operation of machining a groove-welding portion in the instrumentation nozzle, FIG. 14 is a schematic diagram illustrating an operation of machining a plug attachment portion in the instrumentation nozzle, FIG. 15 is a schematic diagram illustrating an operation of attaching a plug to the instrumentation nozzle, FIG. 16 is a schematic diagram illustrating an operation of attaching a housing to the instrumentation nozzle, FIG. 17 is a schematic diagram illustrating an operation of applying a pressing force to the plug, FIG. 18-1 is a schematic diagram illustrating the instrumentation nozzle in which a pressing force is applied to the plug, FIG. 18-2 is a diagram illustrating a pressing force for the plug, FIG. 19 is a schematic diagram illustrating an operation of welding the plug to the instrumentation nozzle, and FIG. 20 is a schematic diagram illustrating the instrumentation nozzle to which the plug is welded.

Hereinafter, a nozzle repair method of the first embodiment will be described in detail with reference to the cross-sectional view of FIG. 1, the flowchart of FIG. 4, and the schematic diagrams from FIGS. 5 to 20.

As illustrated in FIGS. 4 and 5, in step S11, in the pressurized water reactor 12, the lower portion of the nuclear reactor vessel 61 is shielded by a shielding member 101, the conduit tube 85 is shielded by a shielding member 102, and the thimble tube (the neutron flux detector) 88 inserted into the nuclear reactor vessel 61 is extracted to the outside.

Then, as illustrated in FIGS. 4 and 6, in step S12, in the pressurized water reactor 12, the nuclear reactor vessel head 63 is separated from the nuclear reactor vessel body 62 constituting the nuclear reactor vessel 61, and an in-core structure (an upper in-core structure 12A and a lower in-core structure 12B) accommodated therein is raised and removed by a suspending tool 153. In this case, a nuclear reactor building 111 is provided with a cavity 112 capable of storing cooling water, and an appliance temporary placement pool 114 is formed near a nuclear reactor pool 113 where the pressurized water reactor 12 is supported in a suspended state. For that reason, the upper in-core structure 12A and the lower in-core structure 12B are temporarily disposed while being immersed into the cooling water of the appliance temporary placement pool 114.

As illustrated in FIG. 7, in the nuclear reactor vessel body 62, an inner surface of a base material 201 formed of low-alloy steel is provided with a buttered-welding layer 202 formed of stainless steel. Then, the instrumentation nozzle 83 has a configuration in which an in-core instrumentation cylinder 204 formed of a nickel base alloy (for example, Inconel 600/trademark) is inserted and positioned into an attachment hole 203 formed in the lower end plate 66 of the nuclear reactor vessel body 62 in the vertical direction and a groove-welding portion 206 (a lower welding portion 206a and a main welding portion 206b) formed of a nickel base alloy (for example, Inconel 600) is provided in a grooving portion 205 formed in the inner surface of the lower end plate 66.

As illustrated in FIGS. 4 and 7, in step S13, a water stopping plug handling device (not illustrated) is provided above the cavity 112 and a water stopping plug attachment device (not illustrated) gripping a water stopping plug 115 moves downward inside the cooling water of the cavity 112. Then, the water stopping plug 115 is fitted to the upper end of the in-core instrumentation cylinder 204 constituting the instrumentation nozzle 83 of the nuclear reactor vessel body 62 so as to plug the upper end. Further, as illustrated in FIGS. 4 and 8, in step S14, the conduit tube 85 connected to the lower end of the in-core instrumentation cylinder 204 is cut. At this time, the cooling water inside the in-core instrumentation cylinder 204 is removed, and a foreign matter mixing preventing head is attached to the in-core instrumentation cylinder 204 in the instrumentation nozzle 83 which does not need to be repaired.

As illustrated in FIGS. 4 and 9, in step S15, a water stopping cap 116 is fixed to the lower portion of the instrumentation nozzle 83. In this case, the water stopping cap 116 includes a casing 116a of which an upper end is opened and a lower end is closed, a pipe 116b which is connected to the lower portion of the casing 116a, and an opening/closing valve 116c which is provided in the pipe 116b. Meanwhile, the outer surface of the lower end plate 66 is provided with a buttered-welding layer 207 formed of the stainless steel in advance, and the buttered-welding layer 207 is inspected by an ultrasonic inspection device. For that reason, the water stopping cap 116 has a configuration in which the upper end of the casing 116a is welded and fixed to the buttered-welding layer 207 of the lower end plate 66 so as to cover the lower portion of the in-core instrumentation cylinder 204 from the downside. In this case, it is checked whether a leakage occurs by inspecting the welding portion of the casing 116a through a visual test using a camera (not illustrated). Furthermore, a jack 117 is provided inside the water stopping cap 116 so as to support the in-core instrumentation cylinder 204.

When the water is stopped at the upper and lower ends of the existing in-core instrumentation cylinder 204 of the instrumentation nozzle 83, as illustrated in FIGS. 4 and 10, in step S16, the upper portion of the in-core instrumentation cylinder 204 in the instrumentation nozzle 83 is cut (or machined) by a cutting device (not illustrated), and the upper portion of the cut in-core instrumentation cylinder 204 is collected. As illustrated in FIGS. 4 and 11-1, in step S17, the groove-welding portion 206 of the in-core instrumentation cylinder 204 fixed to the lower end plate 66 is trepanned (as a trepanning portion 208) by a machining device (not illustrated), and as illustrated in FIG. 11-2, an opening gap 209 is formed between the in-core instrumentation cylinder 204 and the groove-welding portion 206. That is, the trepanning portion 208 as the connection portion with respect to the in-core instrumentation cylinder 204 in the groove-welding portion 206 is removed. At this time, the trepanning process is performed from the upper end of the groove-welding portion 206, that is, the inner surface of the lower end plate 66 to the downside of the groove-welding portion 206, that is, a base material 201 of the lower end plate 66. Furthermore, when the groove-welding portion 206 of the in-core instrumentation cylinder 204 is trepanned by a cutting device, produced chips are collected by a suction device (not illustrated).

As illustrated in FIGS. 4 and 12, in step S18, the in-core instrumentation cylinder 204 is extracted and collected upward from the attachment hole 203 of the lower end plate 66 by using an extraction device (not illustrated). At this time, the jack 117 inside the water stopping cap 116 may be operated (lengthened) so as to press the in-core instrumentation cylinder 204 upward. Then, as illustrated in FIGS. 4 and 13, in step S19, the groove-welding portion 206 provided in the inner surface of the lower end plate 66 is removed by a machining device (or a discharge processing device or the like) not illustrated in the drawings. In step S20, the groove-welding portion 206 is removed by machining, and the remaining portion or the defect (crack) of the groove-welding portion 206 in a machined surface 210 is inspected by an eddy current inspection device.

Here, when the entire groove-welding portion 206 is removed and the defect (crack) is not found, as illustrated in FIGS. 4 and 14, in step S21, a plug attachment opening (a plug attachment portion) 211 is formed in the inner surface of the lower end plate 66 by a machining device (or a discharge processing device or the like) not illustrated in the drawings. At this time, the plug attachment opening 211 is a columnar opening which is formed in the inner surface of the lower end plate 66. Here, it is desirable to align the axis of the plug attachment opening 211 to the axis of the attachment hole 203. Accordingly, the plug attachment opening 211 is formed so that an inner peripheral surface 211a becomes a vertical surface and an annular bottom surface (a support surface) 211b becomes a horizontal surface.

Furthermore, when the inner surface (the buttered-welding layer 202) of the lower end plate 66 or the inner surface of the plug attachment opening 211 is not sufficiently processed, a finishing process is performed by a polishing device (not illustrated), so that the inner peripheral surface 211a and the bottom surface 211b are formed as flat surfaces. Further, it is checked whether the depth or the width (the inner diameter) of the plug attachment opening 211 is a predetermined depth or a predetermined width by measuring the depth or the width through a visual test using a camera (not illustrated).

Then, as illustrated in FIGS. 4 and 15, in step S22, a plug 212 is attached to the plug attachment opening 211 by fitting. The plug 212 includes a columnar plug body 212a which has an outer diameter to be fitted into the plug attachment opening 211, a vertical wall portion 212b which is formed along an upper outer peripheral portion as a protrusion portion protruding upward in the upper surface of the plug body 212a, a concave portion 212c which is provided inside the vertical wall portion 212b, a protrusion 212d which protrudes downward in the lower surface of the plug body 212a, and a flat lower surface 212e which is provided around the protrusion 212d in the lower surface of the plug body 212a. Further, the plug 212 is formed so that the lower portion is integrated with a screw shaft 213 as a pressing load generating jig. The screw shaft 213 extends from the lower surface of the protrusion 212d in the plug 212 toward the attachment hole 203, and the front end (the lower portion) is provided with a screw portion 213a. In this case, the screw shaft 213 is formed so as to have a length in which the screw portion 213a extends from the attachment hole 203 to the outside of the lower end plate 66 when the plug 212 is attached to the plug attachment opening 211.

When the plug 212 is fitted into the plug attachment opening 211, the plug body 212a is filled in the plug attachment opening 211, the protrusion 212d is fitted into the attachment hole 203, and the screw shaft 213 is inserted into the attachment hole 203. For that reason, in the plug 212, the annular vertical wall portion 212b protrudes upward from the inner surface of the lower end plate 66, and the concave portion 212c is flush with the inner surface of the lower end plate 66. Furthermore, when the plug 212 is fitted into the plug attachment opening 211, a joint surface between the plug 212 and the plug attachment opening 211 is inspected by a visual test using a camera (not illustrated).

Here, as illustrated in FIGS. 4 and 16, an aerial space is formed in the upper portion of the instrumentation nozzle 83, that is, the periphery of the plug attachment opening 211 into which the upper portion of the attachment hole 203 is inserted, and the plug 212 is fixed to the aerial space. That is, a housing 121 of which a lower portion is opened is disposed above the plug attachment opening 211 in the lower end plate 66, and is fixed through a seal member 122 so as to seal an inner space. Then, the cooling water in the space is discharged through a pipe (not illustrated), so that the inside is formed as an aerial space A. Subsequently, a welding device 123 is carried into the housing 121 through a carrying pipe (not illustrated), and the water stopping cap 116 is removed. In this case, the housing 121 is fixed to the upper position of the plug attachment opening 211 in the lower end plate 66 by the seal member 122, the opening/closing valve 116c is opened, and the cooling water inside the housing 121 is discharged from the pipe 116b of the water stopping cap 116, so that the inside may be formed as the aerial space A.

Then, as illustrated in FIGS. 4 and 17, in step S23, a pressing load is applied from the outside of the lower end plate 66 to the plug 212 attached to the plug attachment opening 211. First, the front end of the screw shaft 213 which protrudes from the attachment hole 203 at the outside of the lower end plate 66 penetrates a support plate (a pressing load generating jig) 214, and is temporarily fixed to the buttered-welding layer 207 of the lower end plate 66. Next, a nut (a pressing load generating jig) 215 is held by a nut holding portion 127 of a nut rotation tool 126, and the nut 215 is pressed against the screw portion 213a of the screw shaft 213 while the nut holding portion 127 is rotated. Then, as illustrated in FIG. 18-1, the nut 215 is threaded into the screw portion 213a of the screw shaft 213, so that the plug 212 is fixed.

Here, when the nut 215 is further threaded into the screw portion 213a of the screw shaft 213, the plug 212 is pulled toward the downside, that is, the outside of the lower end plate 66 through the screw shaft 213 from the support plate 214 as the original point. Then, the lower surface 212e of the plug 212 is pressed against the bottom surface 211b of the plug attachment opening 211, and a pressing load exerted toward the lower end plate 66 is applied to the plug 212. In this case, as illustrated in FIG. 18-2, since the plug 212 which is fixed to the plug attachment opening 211 is formed so that a pressing load exerted toward the lower end plate 66 is applied thereto, the lower surface 212e is pressed against the bottom surface 211b. Then, as indicated by the two-dotted chain line of FIG. 18-2, the lower surface 212e of the plug 212 is deformed while being compressed, and the bottom surface 211b of the plug attachment opening 211 is slightly deformed while being compressed.

Then, as illustrated in FIGS. 4 and 19, in step S24, the outer peripheral surface of the vertical wall portion 212b of the plug 212 and the inner surface of the lower end plate 66, that is, the surface of the buttered-welding layer 202 are fillet-welded to each other by the welding device 123 carried into the housing 121 while a welding head 125 is moved by a movement device 124. Then, as illustrated in FIG. 20, when a fillet-welding portion 216 is formed at the corner of the surface of the buttered-welding layer 202 in the lower end plate 66 and the outer peripheral surface of the vertical wall portion 212b while the plug 212 is fitted into the plug attachment opening 211, the plug 212 is fixed to the lower end plate 66.

When the plug 212 is welded, the plug 212 is thermally expanded by the welding heat, and is contracted in a cooled state. For that reason, the plug 212 is contracted upward from the fillet-welding portion 216 as the original point after the plug is cooled. Thus, there is a concern that a gap may be formed between the lower surface 212e and the bottom surface 211b of the plug attachment opening 211. Incidentally, in the embodiment, as described above, the plug 212 is welded while being compressed and deformed by a pressing load applied toward the lower end plate 66. Accordingly, even when the plug is thermally expanded by the welding heat and is contracted upward in a cooled state from the fillet-welding portion 216 as the original point, the lower surface 212e is not separated from the bottom surface 211b of the plug attachment opening 211, and a gap is not formed therebetween.

Furthermore, as the material of the plug 212 attached to the plug attachment opening 211 and the welding material (the fillet-welding portion 216) used to fix the plug 212 to the inner surface of the lower end plate 66, it is desirable to use a nickel base alloy (for example, Inconel 690) as a welding material having higher stress corrosion cracking resistance than nickel base alloy (for example, Inconel 600) as the welding material of the groove-welding portion 206 or the existing in-core instrumentation cylinder 204. However, the plug 212 or the welding material (the fillet-welding portion 216) may be formed of the same material as the existing in-core instrumentation cylinder 204 or the groove-welding portion 206. For example, both may be formed of stainless steel.

Subsequently, in step S25, the fillet-welding portion 216 is inspected by a visual test using a camera (not illustrated).

Here, when a sealing performance is ensured due to the non-existence of the leakage in the fillet-welding portion 216, the housing 121 or the welding device 123 is removed. Further, the foreign matter mixing preventing head which is attached to the in-core instrumentation cylinder 204 in the peripheral instrumentation nozzle 83 that does not need to be repaired is separated.

Furthermore, here, the aerial space A is formed around the plug attachment opening 211, and the plug 212 is welded in the aerial space A. However, for example, the water may be stopped at the upper end of the nuclear reactor vessel body 62 by the seal plate, and the entire water therein may be discharged so as to form the aerial space.

Then, as illustrated in FIGS. 4 and 5, in step S26, the in-core structure (the upper in-core structure 12A and the lower in-core structure 12B) is returned into the nuclear reactor vessel body 62, the nuclear reactor vessel head 63 is attached, and the thimble tube (the neutron flux detector) 88 which is extracted to the outside is inserted into the nuclear reactor vessel 61 so as to be restored. In the pressurized water reactor 12, the shielding member 101 below the nuclear reactor vessel 61 and the shielding member 102 of the conduit tube 85 are removed.

As illustrated in FIG. 1, in the repaired instrumentation nozzle 83, the plug attachment opening 211 is formed in the inner surface of the lower end plate 66 at the upper end of the attachment hole 203 in the attachment hole 203 of the nuclear reactor vessel body 62 having the buttered-welding layer 202 formed of stainless steel as the inner surface of the base material 201 formed of low-alloy steel, the plug 212 is fitted into the plug attachment opening 211, and the outer peripheral surface of the vertical wall portion 212b of the plug 212 and the buttered-welding layer 202 of the lower end plate 66 are fixed and closed by the fillet-welding portion 216. Then, the plug 212 is fitted and fixed to the plug attachment opening 211, and the lower surface 212e is held while contacting the bottom surface 211b of the plug attachment opening 211.

Furthermore, although a pressing load exerted toward the lower end plate 66 is applied to the plug 212 while the screw shaft 213 is fixed to the lower end plate 66 by the nut 215 through the support plate 214, this configuration is used in that the pressing load does not give a bad influence on the lower end plate 66. However, the support plate 214 and the nut 215 may be separated from the screw shaft 213 while the nut 215 is released or the screw shaft 213 may be also removed by cutting.

In this way, the nozzle repair method of the first embodiment includes removing the connection portion (the trepanning portion 208) with respect to the in-core instrumentation cylinder 204 in the groove-welding portion 206, removing the in-core instrumentation cylinder 204 from the lower end plate 66, forming the plug attachment opening 211 by removing the groove-welding portion 206, applying a pressing load to the lower end plate 66 by attaching the plug 212 to the plug attachment opening 211, and welding and fixing the plug 212 attached to the plug attachment opening 211.

Accordingly, the trepanning portion 208 with respect to the in-core instrumentation cylinder 204 in the groove-welding portion 206 is removed, the in-core instrumentation cylinder 204 is removed from the lower end plate 66, the plug attachment opening 211 is formed by removing the groove-welding portion 206, and the plug 212 is welded and fixed to the plug attachment opening 211. That is, when the in-core instrumentation cylinder 204 is removed from the instrumentation nozzle 83, the entire groove-welding portion 206 is removed, and the plug 212 is fixed, the instrumentation nozzle 83 is set to an unavailable state in a closed state. Since the lower end plate 66 of the nuclear reactor vessel 61 is provided with the plurality of instrumentation nozzles 83, even when a small number of instrumentation nozzles 83 may not be used, the other instrumentation nozzles 83 may be used. Accordingly, since the repair operation is easily performed when the instrumentation nozzle 83 is repaired, the workability may be improved and the repair cost may be decreased.

When the plug 212 is welded to the plug attachment opening 211, the welding operation is performed in a state where a pressing load exerted toward the lower end plate 66 is applied to the plug 212 fitted into the plug attachment opening 211 in advance. For that reason, it is possible to suppress a problem in which a gap is formed between the plug 212 and the plug attachment opening 211 even when the plug 212 heated by welding is cooled and hence to highly precisely fix the plug 212 to the plug attachment opening 211 in a close contact state.

In the nozzle repair method of the first embodiment, the lower end plate 66 has a configuration in which the buttered-welding layer 202 having stress corrosion cracking resistance is provided on the inner surface of the base material 201 and the outer peripheral portion is fixed to the buttered-welding layer 202 by welding while the plug 212 is fitted into the plug attachment opening 211. Accordingly, the welding operation for fixing the plug 212 substantially does not give an influence of heat on the base material 201 of the nuclear reactor vessel body 62, and the heat treatment is not needed. Thus, the repair operation may be easily performed, and the workability may be improved.

In the nozzle repair method of the first embodiment, the outer peripheral surface of the vertical wall portion 212b is fixed to the buttered-welding layer 202 by welding while the plug 212 is provided with the upward vertical wall portion 212b and the plug 212 is fitted into the plug attachment opening 211. Accordingly, the amount of the welding material decreases. Thus, the welding cost may be decreased and the welding operation may be easily performed.

In the nozzle repair method of the first embodiment, a concave portion 211c is provided at the inside of the vertical wall portion 211b of the plug 212. Accordingly, since the weight of the plug 212 may be decreased, the cost may be decreased. Also, since the welding heat is radiated through the concave portion 211c, the welding quality may be improved.

In the nozzle repair method of the first embodiment, the plug attachment opening 211 is formed after the groove-welding portion 206 is removed by machining and the non-existence of the defect in the machined surface 210 is checked. Accordingly, since it is possible to reliably check a portion having a stress corrosion crack by checking the existence of the defect in the machined surface 210 obtained by machining the groove-welding portion 206, it is possible to maintain the high-quality nuclear reactor vessel body 62.

In the nozzle repair method of the first embodiment, the plug attachment opening 211 is an opening larger than the attachment hole 203, the bottom surface 211b supporting the plug 212 is provided, and the lower surface 212e of the plug 212 is pressed against the bottom surface 211b so as to apply a pressing load thereto. Accordingly, when the plug 212 is attached and fixed to the plug attachment opening 211, the weight of the plug 212 is supported by the bottom surface 211b of the plug attachment opening 211, and hence the welding portion for fixing the plug 212 to the lower end plate 66 may be simplified. Further, since the plug 212 is attached to the plug attachment opening 211 and is welded thereto while the pressing load is applied thereto, it is possible to suppress a problem in which a gap is formed between the lower surface 212e of the plug 212 and the bottom surface 211b even when the plug 211 heated by welding is cooled and hence to fix the plug 212 to the plug attachment opening 211 in a close contact state.

In the nozzle repair method of the first embodiment, a pressing load is applied to the plug 212 in a manner such that a pulling load is applied thereto through the attachment hole 203 from the outside of the lower end plate 66. Accordingly, the operation is performed on the plug 212 from the outside of the lower end plate 66, the operator does not need to enter the inside of the lower end plate 66, and the pressing load may be easily applied to the plug 212. Thus, the workability may be improved.

In the nozzle repair method of the first embodiment, the lower portion of the nuclear reactor vessel 61 is shielded by the shielding member 101, the conduit tube 85 is shielded by the shielding member 102, the thimble tube 88 inserted into the nuclear reactor vessel 61 is extracted to the outside, the in-core structure is removed from the nuclear reactor vessel body 62, the groove-welding portion 206 and the in-core instrumentation cylinder 204 are removed under the water, and the processing of the plug attachment opening 211 and the welding of the plug 212 are performed in the atmosphere. Accordingly, it is possible to improve the safety by reducing the exposure.

Further, in the nuclear reactor vessel of the first embodiment, the plurality of instrumentation nozzles 83 is provided in the lower end plate 66 of the nuclear reactor vessel body 62, and any attachment hole 203 of the plurality of instrumentation nozzles 83 is plugged by the plug 212 formed of a nickel base alloy having high stress corrosion cracking resistance.

Accordingly, the unnecessary instrumentation nozzle 83 provided in the lower end plate 66 of the nuclear reactor vessel body 62 is plugged by the plug 212, and the repaired nuclear reactor vessel 61 ensures high stress corrosion cracking resistance. Thus, the repair cost may be decreased and the stress corrosion cracking resistance may be improved.

Then, the screw shaft 213, the support plate 214, and the nut 215 are provided as the pressing load generating jig for the plug. Accordingly, the pressing load may be easily applied to the plug 212, and hence the workability may be improved. In this case, the pressing load of pressing the plug 212 against the plug attachment opening 211 may be easily applied to the plug in a manner such that the screw shaft 213 is fixed to the lower surface of the plug 212 in advance.

Furthermore, in the first embodiment, the lower portion of the nuclear reactor vessel 61 and the conduit tube 85 are shielded, the thimble tube 88 is extracted to the outside from the nuclear reactor vessel 61, the in-core structure is removed from the nuclear reactor vessel body 62, the groove-welding portion 206 and the in-core instrumentation cylinder 204 are removed under the water, and the processing of the plug attachment opening 211 and the welding of the plug 212 are performed in the atmosphere. However, the invention is not limited thereto. For example, a configuration may be employed in which the in-core structure is removed from the nuclear reactor vessel body 62, a thimble stand is disposed inside the nuclear reactor vessel 61, the thimble tube 88 of the instrumentation nozzle 83 which is not repaired is supported, the groove-welding portion 206 and the in-core instrumentation cylinder 204 are removed under the water, and the processing of the plug attachment opening 211 and the welding of the plug 212 are performed in the atmosphere.

Second Embodiment

Figure 21:
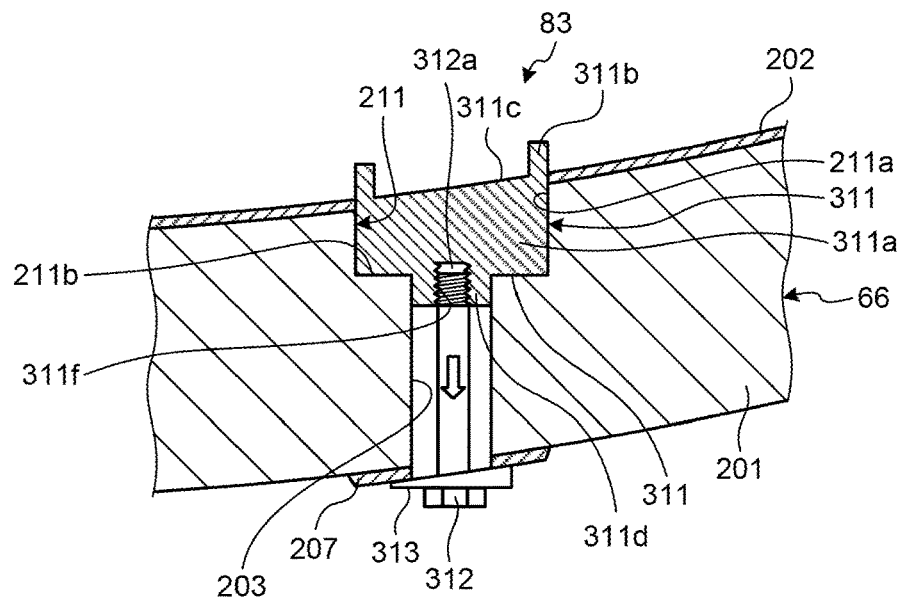
FIG. 21 is a schematic diagram illustrating an operation of attaching a plug used in a nozzle repair method according to a second embodiment of the invention.

FIG. 21 is a schematic diagram illustrating an operation of attaching a plug used in a nozzle repair method according to a second embodiment of the invention. Furthermore, the same reference numerals will be given to the same components having the same functions as the above-described embodiment, and the detailed description thereof will not be presented.

The nozzle repair method of the second embodiment is different from that of the first embodiment in that the plug and the pressing load generating jig are different. As illustrated in FIG. 21, the plug attachment opening 211 which is formed in the inner surface of the lower end plate 66 includes the inner peripheral surface 211a and the bottom surface 211b. Meanwhile, a plug 311 which is attached to the plug attachment opening 211 includes a plug body 311a, a vertical wall portion 311b, a concave portion 311c, a protrusion 311d, and a lower surface 311e, and also includes a female screw portion 311f provided in the protrusion 311d.

When the plug 311 is fitted into the plug attachment opening 211, the plug body 311a is filled in the plug attachment opening 211, the protrusion 311d is fitted into the attachment hole 203, the annular vertical wall portion 311b protrudes upward from the inner surface of the lower end plate 66, and the concave portion 311c is flush with the inner surface of the lower end plate 66.

Here, an operation of applying a pressing load to the plug 311 attached to the plug attachment opening 211 from the outside of the lower end plate 66 is performed. A screw shaft 312 is prepared as the pressing load generating jig to be threaded into the female screw portion 311f of the plug 311. The screw shaft 312 is set to have a length in which the screw shaft may be threaded into the female screw portion 311f of the plug 311. First, a support plate 313 is temporarily fixed to the buttered-welding layer 207 of the lower end plate 66 corresponding to the attachment hole 203 at the outside of the lower end plate 66. Next, the screw shaft 312 is held by a rotation tool (not illustrated), and is caused to penetrate the support plate 313. Then, the front end of the screw shaft 312 is pressed against the female screw portion 311f in a rotation state, the screw shaft 213 is threaded into the female screw portion 311f, and the screw shaft is fixed to the plug 311.

Here, when the screw shaft 312 is further threaded into the female screw portion 311f, the plug 311 is pulled toward the downside, that is, the outside of the lower end plate 66 through the screw shaft 312 from the support plate 313 as the original point. Then, a pressing load exerted toward the lower end plate 66 is applied to the plug 311 while the lower surface 311e is pressed against the bottom surface 211b of the plug attachment opening 211. Here, the outer peripheral surface of the vertical wall portion 311b of the plug 311 and the inner surface of the lower end plate 66, that is, the surface of the buttered-welding layer 202 are fillet-welded.

The plug 311 is thermally expanded by the welding heat and is contracted in a cooled state. However, since the plug 311 is welded while being compressed and deformed due to a pressing load exerted toward the lower end plate 66, the lower surface 311e is not separated from the bottom surface 211b of the plug attachment opening 211 even when the plug is thermally expanded and contracted in a cooled state, and hence a gap therebetween is suppressed.

In this way, in the second embodiment, the plug 311 is provided with the female screw portion 311f, the screw shaft 312, and the support plate 313 as the pressing load generating jig. Accordingly, a pressing load may be easily applied to the plug 311, and hence the workability may be improved. In this case, since the female screw portion 311f is formed in the lower surface 311e of the plug 311 in advance, a pressing load of pressing the plug 311 against the plug attachment opening 211 may be applied to the plug.

Third Embodiment

Figure 22:
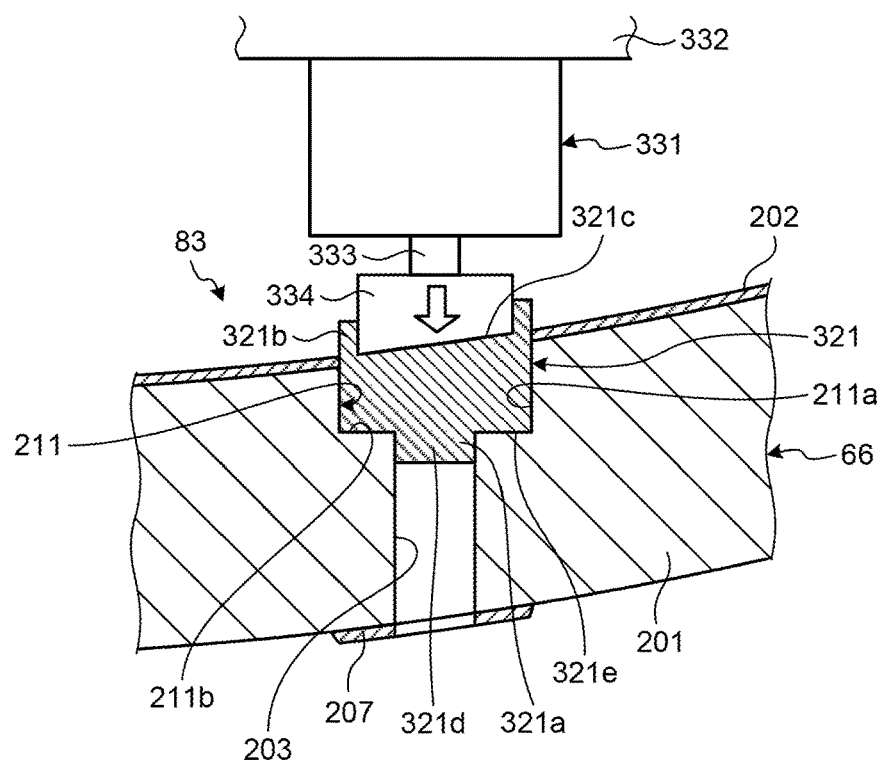
FIG. 22 is a schematic diagram illustrating an operation of attaching a plug used in a nozzle repair method according to a third embodiment of the invention.

FIG. 22 is a schematic diagram illustrating an operation of attaching a plug used in a nozzle repair method according to a third embodiment of the invention. Furthermore, the same reference numerals will be given to the same components having the same functions as the above-described embodiment, and the detailed description thereof will not be presented.

The nozzle repair method of the third embodiment is different from those of the first and second embodiments in that the plug and the pressing load generating jig are different. As illustrated in FIG. 22, the plug attachment opening 211 which is formed in the inner surface of the lower end plate 66 includes the inner peripheral surface 211a and the bottom surface 211b. Meanwhile, the plug 321 which is attached to the plug attachment opening 211 includes a plug body 321a, a vertical wall portion 321b, a concave portion 321c, a protrusion 321d, and a lower surface 321e.

When the plug 321 is fitted into the plug attachment opening 211, the plug body 321a is filled in the plug attachment opening 211, the protrusion 321d is fitted into the attachment hole 203, the annular vertical wall portion 321b protrudes upward from the inner surface of the lower end plate 66, and the concave portion 321c is flush with the inner surface of the lower end plate 66.

Here, an operation of applying a pressing load to the plug 321 attached to the plug attachment opening 211 from the outside of the lower end plate 66 is performed. A pressing cylinder 331 is prepared as the pressing load generating jig that presses the plug 321 against the plug attachment opening 211. The pressing cylinder 311 includes a pressing portion 334 which is supported by the support base 322 through a driving rod 333. First, a pressing cylinder 331 is operated so as to lengthen the driving rod 333 so that the pressing portion 334 contacts the concave portion 331c of the plug 321. Next, the driving rod 333 is further lengthened by the pressing cylinder 331 so that the plug 321 is pressed by the pressing portion 334. Then, the lower surface 321e of the plug 321 is pressed against the bottom surface 211b of the plug attachment opening 211, so that a pressing load exerted toward the lower end plate 66 is generated. In this state, the outer peripheral surface of the vertical wall portion 321b of the plug 321 and the inner surface of the lower end plate 66, that is, the surface of the buttered-welding layer 202 are fillet-welded. Subsequently, the pressing cylinder 331 is removed.

The plug 321 is thermally expanded by the welding heat and is contracted in a cooled state. However, since the plug 321 is welded while being compressed and deformed by a pressing load exerted toward the lower end plate 66, the lower surface 321e is not separated from the bottom surface 211b of the plug attachment opening 211 even when the plug is thermally expanded and contracted in a cooled state, and hence a gap therebetween is suppressed.

In this way, in the third embodiment, the pressing cylinder 331 is prepared as the pressing load generating jig, and the plug 321 is pressed by the pressing cylinder 331 from the inside of the lower end plate 66, so that a pressing load is applied to the plug. Accordingly, there is no need to perform various processing operations for the plug 321. Thus, the structure of the plug 321 may be simplified and the manufacturing cost may be decreased.

Fourth Embodiment

Figure 23:
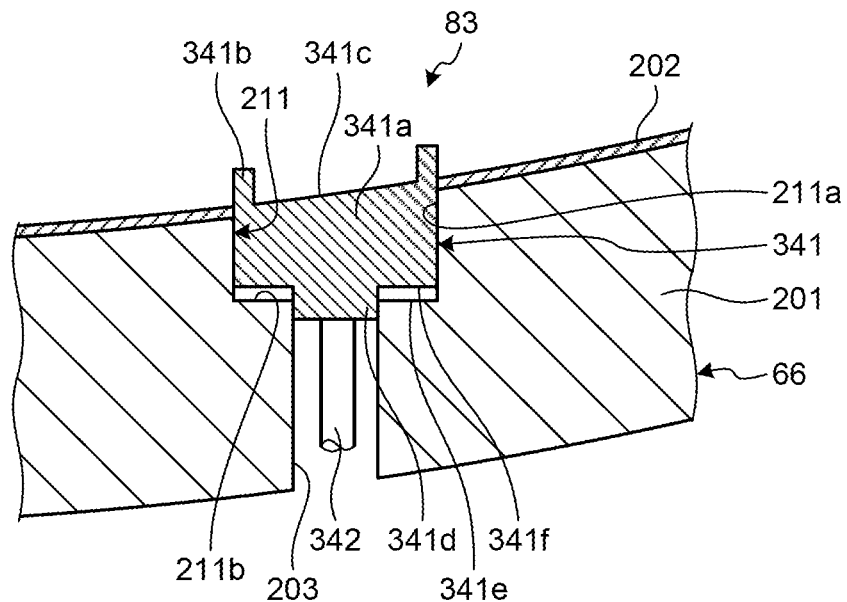
FIG. 23 is a schematic diagram illustrating an operation of attaching a plug used in a nozzle repair method according to a fourth embodiment of the invention.
Figure 24:
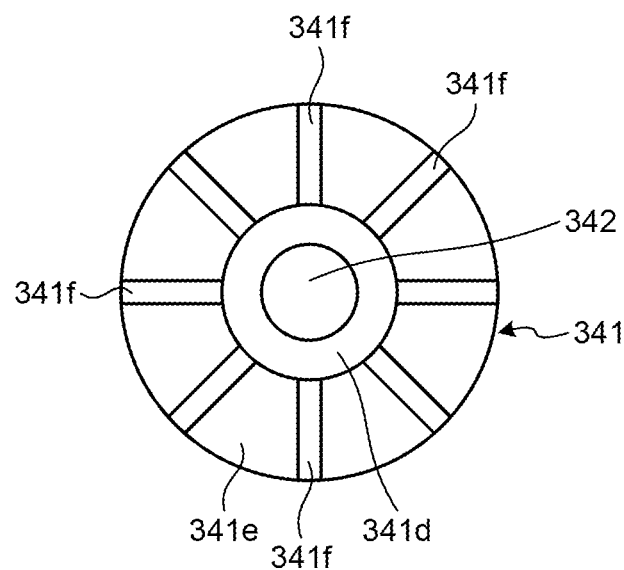
FIG. 24 is a bottom view of a plug of the fourth embodiment.

FIG. 23 is a schematic diagram illustrating an operation of attaching a plug used in a nozzle repair method according to a fourth embodiment of the invention, and FIG. 24 is a bottom view illustrating the plug of the fourth embodiment. Furthermore, the same reference numerals will be given to the same components having the same functions as the above-described embodiment, and the detailed description thereof will not be presented.

The nozzle repair method of the fourth embodiment is different from that of the first embodiment in that the plug is different. As illustrated in FIGS. 23 and 24, the plug attachment opening 211 which is formed in the inner surface of the lower end plate 66 includes the inner peripheral surface 211a and the bottom surface 211b. Meanwhile, the plug 341 which is attached to the plug attachment opening 211 includes a plug body 341a, a vertical wall portion 341b, a concave portion 341c, a protrusion 341d, and a lower surface 341e. Further, the plug 341 is provided with a plurality of groove portions 341f which is formed in the radial direction of the lower surface 341e at the same interval in the circumferential direction. The plurality of groove portions 341f serves as a deformation member that is provided between the lower surface 341e of the plug 341 and the bottom surface 211b of the plug attachment opening 211.

When the plug 341 is fitted into the plug attachment opening 211, the plug body 341a is filled in the plug attachment opening 211, the protrusion 341d is fitted into the attachment hole 203, the annular vertical wall portion 341b protrudes upward from the inner surface of the lower end plate 66, and the concave portion 341c is flush with the inner surface of the lower end plate 66. At this time, the plug 341 is formed so that the lower surface 341e excluding the groove portions 341f contacts the bottom surface 211b of the plug attachment opening 211.

Here, an operation of applying a pressing load to the plug 341 attached to the plug attachment opening 211 from the outside of the lower end plate 66 is performed. That is, when the screw shaft 342 of the plug 341 is pulled downward, the lower surface 341e of the plug 341 is pressed against the bottom surface 211b of the plug attachment opening 211, and hence a pressing load exerted toward the lower end plate 66 is applied thereto. In this state, the outer peripheral surface of the vertical wall portion 341b of the plug 341 and the inner surface of the lower end plate 66, that is, the surface of the buttered-welding layer 202 are fillet-welded. At this time, since the plug 341 is welded while being compressed and deformed by a pressing load exerted toward the lower end plate 66, the lower surface 341e is not separated from the bottom surface 211b of the plug attachment opening 211 even when the plug is thermally expanded by the welding heat and is contracted in a cooled state, and hence a gap therebetween is suppressed. Then, since the plug 341 has a configuration in which the lower surface 341e is provided with the plurality of groove portions 341f, the strength of the lower portion is slightly degraded. Accordingly, the plug may be easily compressed and deformed.

In this way, in the fourth embodiment, the lower surface 341e of the plug 341 is provided with the plurality of groove portions 341f. Accordingly, when a pressing load of pressing the plug 341 against the plug attachment opening 211 is applied to the plug, the strength of the lower portion is slightly degraded by the plurality of groove portions 341f, and hence the plug may be easily compressed and deformed. Thus, the plug 341 may be easily compressed and deformed.

Furthermore, in the fourth embodiment, the plurality of groove portions 341f is formed in the lower surface 341e of the plug 341 as the deformation member of the invention, but the invention is not limited to this configuration. For example, the concave portion may be proved instead of the groove portion 341f. Further, the concave portion may be provided separately from the plug 341.

Further, in the above-described embodiments, the machining operation is performed so that the axis of the plug attachment opening 211 matches the axis of the attachment hole 203, but the machining operation may be performed so that the axis of the plug attachment opening 211 is aligned to the radial direction of the lower end plate 66. Further, the plug attachment opening 211 is formed as a columnar shape, but the invention is not limited to the shape. For example, a prismatic shape, a semi-spherical shape, or a conical shape may be employed.

Further, in the above-described embodiments, the vertical wall portions 212b, 311b, 321b, and 341b having the concave portions 212c, 311c, 321c, and 341c at the inside thereof are provided as the protrusion portions protruding upward from the upper surfaces of the plug bodies 212a, 311a, 321a, and 341a, but the concave portions 212c, 311c, 321c, and 341c may not be provided.

Further, in the above-described embodiment, a method of repairing the instrumentation nozzle 83 provided in the lower end plate 66 of the nuclear reactor vessel body 62 has been described, but the method may be also used to repair the instrumentation nozzle provided in the upper end plate of the nuclear reactor vessel head 63. Further, a case has been described in which the nozzle repair method of the invention is applied to the pressurized water reactor, but the nozzle repair method may be also applied to a boiling-water nuclear reactor.

REFERENCE SIGNS LIST

61 NUCLEAR REACTOR VESSEL
62 NUCLEAR REACTOR VESSEL BODY
63 NUCLEAR REACTOR VESSEL HEAD
66 LOWER END PLATE (SEMI-SPHERICAL PORTION)
83 INSTRUMENTATION NOZZLE
84 IN-CORE INSTRUMENTATION GUIDE PIPE
85 CONDUIT TUBE
88 THIMBLE PIPE
126 NUT ROTATION TOOL
201 BASE MATERIAL
202 BUTTERED-WELDING LAYER
203 ATTACHMENT HOLE
204 IN-CORE INSTRUMENTATION CYLINDER
205 GROOVING PORTION
206 GROOVE-WELDING PORTION
208 TREPANNING PORTION (CONNECTION PORTION)
210 MACHINED SURFACE
211 PLUG ATTACHMENT OPENING (PLUG ATTACHMENT PORTION)
211b BOTTOM SURFACE (SUPPORT SURFACE)
212, 311, 321, 341 PLUG
212b, 311b, 321b, 341b VERTICAL WALL PORTION (PROTRUSION PORTION)
212c, 311c, 321c, 341c CONCAVE PORTION
212e, 311e, 321e, 341e LOWER SURFACE (SUPPORT SURFACE)
213, 312 SCREW SHAFT (PRESSING LOAD GENERATING JIG)
214, 313 SUPPORT PLATE (PRESSING LOAD GENERATING JIG)
215 NUT (PRESSING LOAD GENERATING JIG)
216 FILLET-WELDING PORTION
311f FEMALE SCREW PORTION
331 PRESSING CYLINDER

The invention claimed is:

1. A nozzle repair method for a nuclear reactor instrumentation nozzle comprising an in-core instrumentation cylinder inserted into an attachment hole in a semi-spherical portion of a nuclear reactor vessel and a groove-weld portion between an inner surface of the semi-spherical portion and an outer surface of the in-core instrumentation cylinder, the semi-spherical portion being provided with a buttered-welding layer having stress corrosion cracking resistance on an inner surface thereof, by using a plug including a plug body having a columnar shape, a vertical wall portion protruding upward from an upper surface of an peripheral portion of the plug body, a concave portion surrounded by the vertical wall portion, a protrusion protruding downward from a lower surface of the plug body, a flat lower surface formed around the protrusion on the lower surface of the plug body, a screw shaft extending downward from a bottom surface of the protrusion and having a screw portion at an end portion thereof, the nozzle repair method comprising:
   removing the in-core instrumentation cylinder from a reactor vessel by severing the groove weld portion between the groove weld portion and the in-core instrumentation cylinder;
   forming a plug attachment portion by forming a columnar opening at the inner surface of the semi-spherical portion such that an axis of the columnar opening aligns with an axis of the attachment hole;
   inserting the plug to the plug attachment portion;
   deforming the flat lower surface of the plug and a bottom surface of the plug attachment portion by applying a pressing load to the plug toward the semi-spherical portion by attaching a support plate and a nut to the screw portion of the screw shaft such that the support plate is positioned between the nut and an outer surface of the semi-spherical portion, and screwing the nut to the screw portion; and
   welding the plug to the plug attachment portion with the flat lower surface of the plug and the bottom surface of the plug attachment portion deformed.

2. The nozzle repair method according to claim 1, wherein the welding includes welding an outer peripheral portion of the plug to the buttered-welding layer while the plug is fitted into the plug attachment portion.

3. The nozzle repair method according to claim 1, wherein the welding includes welding an outer surface of the vertical wall portion to the semi-spherical portion while the plug is fitted into the plug attachment portion.

* * * * *